US012560972B2

(12) United States Patent
Bae et al.

(10) Patent No.: US 12,560,972 B2
(45) Date of Patent: Feb. 24, 2026

(54) FLEXIBLE DISPLAY AND ELECTRONIC DEVICE INCLUDING SAME

(71) Applicant: Samsung Electronics Co., Ltd., Gyeonggi-do (KR)

(72) Inventors: Jaehyun Bae, Gyeonggi-do (KR); Youngmin Moon, Gyeonggi-do (KR); Hyunsuk Choi, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 205 days.

(21) Appl. No.: 18/219,793

(22) Filed: Jul. 10, 2023

(65) Prior Publication Data

US 2023/0350465 A1     Nov. 2, 2023

Related U.S. Application Data

(63) Continuation of application No. PCT/KR2022/008817, filed on Jun. 22, 2022.

(30) Foreign Application Priority Data

Jun. 24, 2021     (KR) ......................... 10-2021-0082513

(51) Int. Cl.
*G06F 1/16*          (2006.01)
*H04M 1/02*          (2006.01)
(52) U.S. Cl.
CPC .......... *G06F 1/1656* (2013.01); *G06F 1/1652* (2013.01); *H04M 1/0268* (2013.01)
(58) Field of Classification Search
CPC ................. G06F 1/1656; G06F 1/1652; G06F 2203/04102; H04M 1/0268; H04M 1/0235; G09F 9/30; G09F 9/301; H10K 50/84
See application file for complete search history.

(56) References Cited

U.S. PATENT DOCUMENTS 9,348,450 B1 *     5/2016     Kim ..................... H04M 1/0268
10,014,352 B1 *    7/2018     Tsai ...................... H10K 59/40
(Continued)

FOREIGN PATENT DOCUMENTS

CN          212809620 U       3/2021
CN          112967609 A       6/2021
(Continued)

OTHER PUBLICATIONS

Extended European Search Report dated Sep. 25, 2024.

*Primary Examiner* — Rockshana D Chowdhury
(74) *Attorney, Agent, or Firm* — CANTOR COLBURN LLP

(57)          ABSTRACT

According to certain embodiments, a rollable display device comprises: a housing; a roller disposed inside the housing; and a flexible display configured to be at least partially wound on the roller, the flexible display including a pixel layer and a window, wherein the window includes: a first region having a substantially constant thickness, a second region extending from one end of the first region having a thickness that gradually decreases with a first inclination, in a direction away from the one end of the first region, and a third region extending from one end of the second region having a thickness that gradually decreases with a second inclination different from the first inclination, in a direction away from the second region, and wherein at least a portion of the second region and the third region are configured to be drawn into interior of the rollable display device when the flexible display is wound around the roller.

25 Claims, 16 Drawing Sheets

(56) References Cited

U.S. PATENT DOCUMENTS

| | | | |
|---|---|---|---|
| 10,020,462 B1 | 7/2018 | Ai et al. | |
| 10,375,839 B2* | 8/2019 | Jung | H05K 1/028 |
| 10,466,748 B2 | 11/2019 | Choi et al. | |
| 10,522,060 B2* | 12/2019 | Park | H10K 59/873 |
| 10,795,415 B2 | 10/2020 | Cavallaro et al. | |
| 11,003,326 B2* | 5/2021 | Son | G06F 3/0483 |
| 11,322,054 B2* | 5/2022 | Park | G09F 9/301 |
| 11,341,872 B2 | 5/2022 | Lee | |
| 11,360,517 B2* | 6/2022 | Paek | G06F 1/1652 |
| 11,372,137 B2* | 6/2022 | Gu | H05K 5/03 |
| 11,493,962 B2* | 11/2022 | Moon | G06F 1/1616 |
| 11,500,422 B2* | 11/2022 | Heo | H04M 1/0266 |
| 11,633,943 B2* | 4/2023 | Lv | B32B 3/18 |
| | | | 428/201 |
| 11,647,644 B2* | 5/2023 | Sunwoo | C03C 15/00 |
| | | | 257/40 |
| 11,781,371 B2* | 10/2023 | Park | E06B 3/28 |
| | | | 428/212 |
| 11,914,424 B2* | 2/2024 | Ahn | B32B 27/281 |
| 12,007,805 B2* | 6/2024 | Liu | G06F 1/1616 |
| 12,041,738 B2* | 7/2024 | Nguyen | H04M 1/0268 |
| 12,093,081 B2* | 9/2024 | Wang | H10K 77/111 |
| 12,114,451 B2* | 10/2024 | Nguyen | H05K 5/03 |
| 12,142,632 B2* | 11/2024 | Nguyen | H10H 20/819 |
| 12,159,557 B2* | 12/2024 | Park | G09F 9/301 |
| 12,212,701 B2* | 1/2025 | Kim | H04M 1/0268 |
| 12,240,781 B2* | 3/2025 | Agnello | G02F 1/133331 |
| 2014/0183473 A1* | 7/2014 | Lee | G06F 1/1641 |
| | | | 257/40 |
| 2015/0004334 A1* | 1/2015 | Bae | B32B 38/0008 |
| | | | 156/298 |
| 2015/0357387 A1 | 12/2015 | Lee et al. | |
| 2020/0139672 A1* | 5/2020 | Cao | B32B 27/06 |
| 2020/0209925 A1* | 7/2020 | Paek | H10K 77/111 |
| 2020/0292731 A1 | 9/2020 | Park et al. | |
| 2020/0329575 A1* | 10/2020 | Park | G02B 1/14 |
| 2021/0002947 A1 | 1/2021 | Park et al. | |
| 2021/0282285 A1* | 9/2021 | Sunwoo | B32B 1/00 |
| 2021/0408406 A1* | 12/2021 | Hu | H10K 77/111 |
| 2022/0106218 A1* | 4/2022 | Cao | C03C 15/00 |
| 2022/0126408 A1* | 4/2022 | Deng | B29C 63/30 |
| 2022/0183148 A1* | 6/2022 | Wang | G06F 3/0412 |
| 2022/0201885 A1* | 6/2022 | Nguyen | G06F 1/1652 |
| 2022/0209165 A1* | 6/2022 | Hyun | H10K 59/871 |
| 2022/0287195 A1* | 9/2022 | Chen | B32B 7/12 |
| 2022/0291712 A1* | 9/2022 | Baby | G06F 1/1637 |
| 2022/0322553 A1* | 10/2022 | Zhang | G09F 9/301 |
| 2022/0368786 A1* | 11/2022 | Kim | G06F 1/1686 |
| 2023/0063293 A1* | 3/2023 | Ro | G06F 3/0446 |
| 2023/0336651 A1* | 10/2023 | Won | G06F 1/1681 |
| 2024/0126323 A1* | 4/2024 | Jin | G06F 1/1652 |
| 2024/0224774 A1* | 7/2024 | Park | H10K 59/873 |
| 2024/0368031 A1* | 11/2024 | Park | C03C 15/00 |

FOREIGN PATENT DOCUMENTS

| | | | |
|---|---|---|---|
| KR | 10-2017-0013540 A | 2/2017 | |
| KR | 10-2017-0122554 A | 11/2017 | |
| KR | 10-2019-0078226 A | 7/2019 | |
| KR | 10-2019-0084188 A | 7/2019 | |
| KR | 10-2020-0008727 A | 1/2020 | |
| KR | 10-2068685 B1 | 1/2020 | |
| KR | 10-2068729 B1 | 1/2020 | |
| KR | 10-2102688 B1 | 4/2020 | |
| KR | 10-2020-0070899 A | 6/2020 | |
| KR | 10-2020-0094633 A | 8/2020 | |
| KR | 10-2150392 B1 | 9/2020 | |
| KR | 10-2203104 B1 | 1/2021 | |

* cited by examiner

721

711        712        713

710 { 711
      712
      713

+z

+x   -x

-z

FLEXIBLE DISPLAY AND ELECTRONIC DEVICE INCLUDING SAME

CROSS-REFERENCE TO RELATED APPLICATION(S)

This application is a continuation of International Application No. PCT/KR2022/008817, which was filed on Jun. 22, 2022 and claims priority to Korean Patent Application No. 10-2021-0082513, which was filed on Jun. 24, 2021 in the Korean Intellectual Property Office, the disclosures of which are incorporated by reference herein in their entirety.

BACKGROUND

Technical Field

Certain embodiments disclosed herein relate to a flexible display and an electronic device including the flexible display.

Description of Related Art

Flexible displays provide the user with the benefits of both large display and portability. A large display improves the user experience, but also increases one of the dimensions of the electronic device. This makes it difficult for the user to carry in their pocket or purse. However, a flexible display allows the user to enjoy the large screen when using the device, while reducing the size of the screen when carrying the electronic device.

If a display device is rollable, it may provide an electronic device with a large display that is portable. The portability would be secured through reduction of the display by allowing a portion of the display to be drawn into the housing of the electronic device. In addition, an electronic device including a rollable display would provide convenience by providing a user with a wide screen when the display is drawn out from the housing.

However, in order for the display to be rollable, the display would need to be quite thin. This can be a problem for an electronic device including a a pen function. In order to use the pen function of an electronic device including the display, a sufficient thickness of the display may be required. It may be difficult to provide a display that is thin enough to be flexible or rollable, but thick enough to withstand the pressure from the pen. In addition, when the thickness of the display is reduced in order to implement the flexible display drawn into the housing, the durability of the display may be reduced.

Using differential thickness can cause a visibility problem. That is, as the thickness varies, a problem of visibility may occur at a boundary surface of the display. For example, when the electronic device includes a display having different thicknesses, as the difference in thickness between increases, wrinkles may occur at the boundary of the thickness differential due to the difference in the amount of expansion of the displays.

Wrinkles generated on a display may be detrimental to visibility of a screen output by the display and may impair the appearance of the electronic device.

SUMMARY

According to certain embodiments, a rollable display device comprises: a housing; a roller disposed inside the housing; and a flexible display configured to be at least partially wound on the roller, the flexible display including a pixel layer and a window, wherein the window includes: a first region having a substantially constant thickness, a second region extending from one end of the first region having a thickness that gradually decreases with a first inclination, in a direction away from the one end of the first region, and a third region extending from one end of the second region having a thickness that gradually decreases with a second inclination different from the first inclination, in a direction away from the second region, and wherein at least a portion of the second region and the third region are configured to be drawn into interior of the rollable display device when the flexible display is wound around the roller.

According to certain embodiments, a rollable display device comprises: a housing; a roller disposed inside the housing; and a flexible display configured to at least partially wind around the roller and including a window, wherein the window includes: a first window portion including a first region, wherein the first region is always exposed to exterior, and a second window portion formed of a material different from that of the first window portion, wherein the second window portion includes: a second region facing one surface of the first region and having a thickness that gradually decreases, with a first inclination, in a direction away from the one surface of the first region, and a third region extending from one end of the second region having a thickness that gradually decreases, with a second inclination different from the first inclination, in a direction away from the one end of the second region, and wherein at least part of the second window portion is configured to be drawn into the rollable display device as the flexible display is wound around the roller.

BRIEF DESCRIPTION OF THE DRAWINGS

In connection with the description of the drawings, the same or similar components may be denoted by the same or similar reference numerals.

DETAILED DESCRIPTION

Hereinafter, certain embodiments of the disclosure will be described with reference to the accompanying drawings. However, it shall be understood that it is not intended to limit the disclosure to specific embodiments, and that the disclosure includes various modifications, equivalents, and/or alternatives of the embodiments of the disclosure.

The flexible display and the electronic device including the flexible display according to certain embodiments disclosed herein are capable of preventing the occurrence of wrinkles due to a sharp difference in the expansion rate, while having a variable thickness on the rolling portion.

In addition, according to certain embodiments, it is possible to provide a flexible display and electronic device having sufficient strength for a pen function in at least a partial region while ensuring visibility.

In addition, various effects directly or indirectly identified through the disclosure may be provided.

Figure 1:
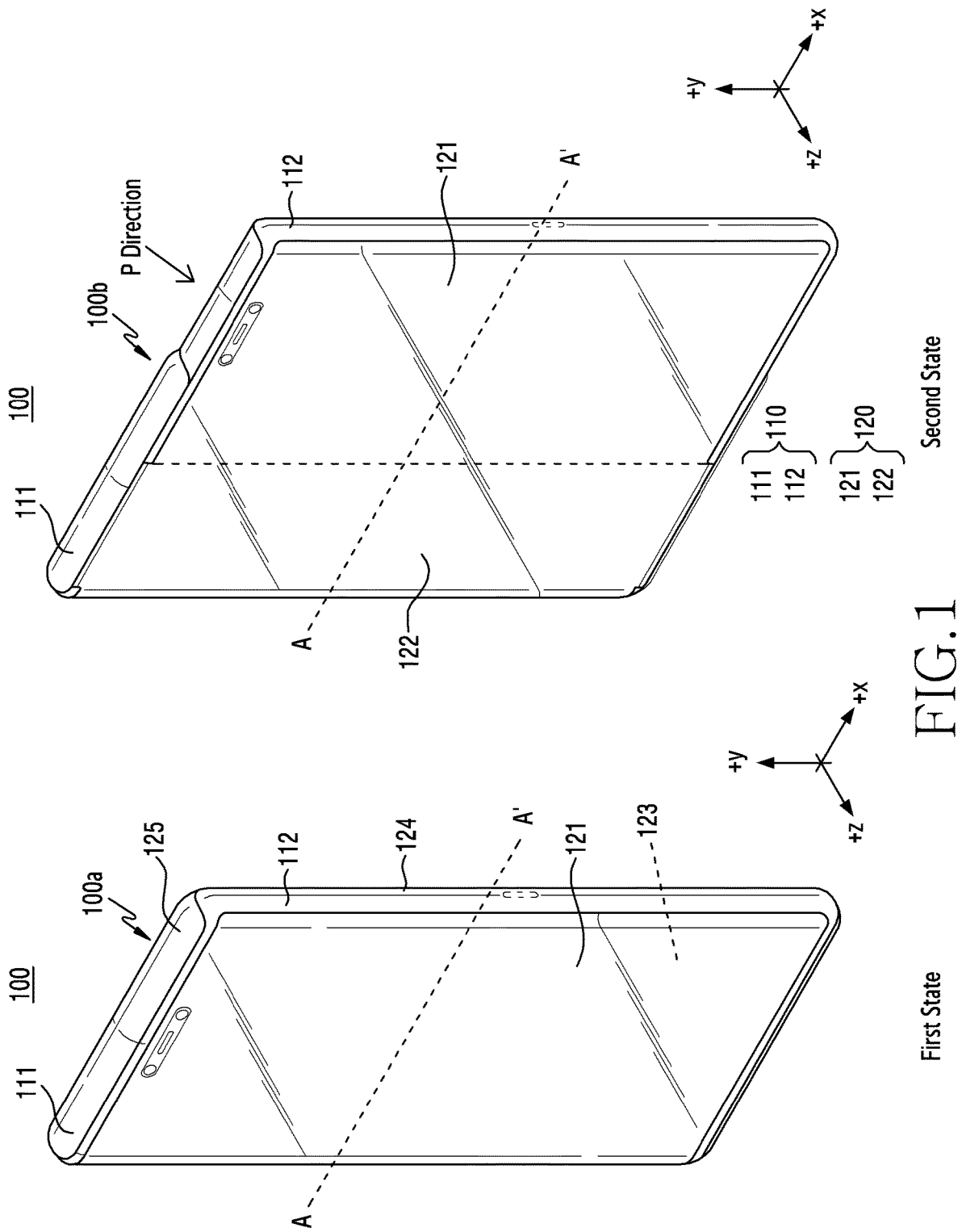
FIG. 1 illustrates front perspective views of an electronic device according to an embodiment.

FIG. 1 describes an electronic device with a flexible display. In the first state, the display size is minimized and only first part 121 of the display 120 is visible. In the second state, the display size is maximized and the second part 122 of the display 120 is visible, as well as the first part 121. The display is maximized by moving member 111 away from member 112. When moving member 111 away from member 112, a second part 122 of the display 120 becomes visible.

FIG. 1 illustrates front perspective views that show a first state (e.g., a contracted state) or a second state (e.g., an expanded state) of an electronic device according to an embodiment.

The front surface can be the surface the +z direction in which at least a portion (e.g., a first portion 121) of the flexible display 120 faces. The rear surface of the electronic device 100 can be the surface facing substantially the opposite direction from the front surface, e.g., the −z direction. In addition, the surface surrounding the space between the front surface and the rear surface may be defined as the side surface of the electronic device 100.

At least a portion of the flexible display 120 may be disposed on the front surface of the electronic device 100. The flexible display 120 may include at least a portion having a flat shape and at least a portion that is curved. A housing 110 may surrounding at least a portion of the edge of the flexible display 120.

The housing 110 may form a partial region of the front surface, the rear surface, and the side surface of the electronic device 100. According to another embodiment, the housing 110 may form a partial region of the side surface and the rear surface of the electronic device 100. The housing 110 may include a first housing 111 movably connected to a second housing 112.

The first housing 111 of the electronic device includes a first side surface portion 124 surrounding the flexible display 120 and a second side surface portion 125 perpendicular to the first side surface portion.

The housing 110 may include a first housing 111 and a second housing 112 coupled to the first housing 111 to be movable relative to the first housing 111 within a predetermined range.

The flexible display 120 may include a first portion 121 that is coupled to the second housing 112 and a second portion 122 that extends from the first portion 121 and is capable of being drawn into the interior of the electronic device 100 or brought about on the surface of the electronic device 100. For example, the first portion 121 may always be exposed to the exterior of the electronic device 100. For example, when the second part 122 is drawn into the interior of the electronic device 100 (e.g., the first state 100a), the second portion 122 may not be exposed to the exterior of the electronic device 100.

The electronic device 100 may have a first state 100a and a second state 100b. For example, the first state 100a and the second state 100b of the electronic device 100 may be determined depending on a moving distance of the second housing 112 relative to the first housing 111, and the state of the electronic device 100 may be changed between the first state 100a and the second state 100b by a user's manipulation or mechanical operation.

The first state 100a of the electronic device 100 may mean a state before the housing 110 is expanded. The second state 100b of the electronic device 100 may mean a state in which the housing 110 is expanded.

When the state of the electronic device 100 is switched from the first state 100a to the second state 100b according to the movement of the second housing 112, the second portion 122 of the flexible display 120 may be drawn out (or exposed) from the inside of the electronic device 100 to the outside. When the flexible display 120 is drawn out, it may mean that the flexible display 120 is viewable from the exterior of the electronic device 100. When the electronic device 100 is switched from the second state 100b to the first state 100a according to the movement of the second housing 112, the second portion 122 of the flexible display 120 is capable of being drawn into the interior of the electronic device 100. According to an embodiment, when the flexible display 120 is drawn into, it may mean that at least a portion (e.g., the second portion 122) of the flexible display 120 is not viewable from the exterior of the electronic device 100.

The flexible display 120 includes a first portion 121 that can always be exposed and can generally be flat and rigid. The display 120 also includes a second portion 122 that is bendable. The second portion 122 can be wound about a roller 260. As the electronic device 100 is transitioned from a first state to a second state, an intermediate state, the second portion 122 is unwound from the roller 260. As the electronic device 100 is transitioned from the second state to the first state, also the intermediate state, the second portion 122 is wound about the roller 260.

Figure 2:
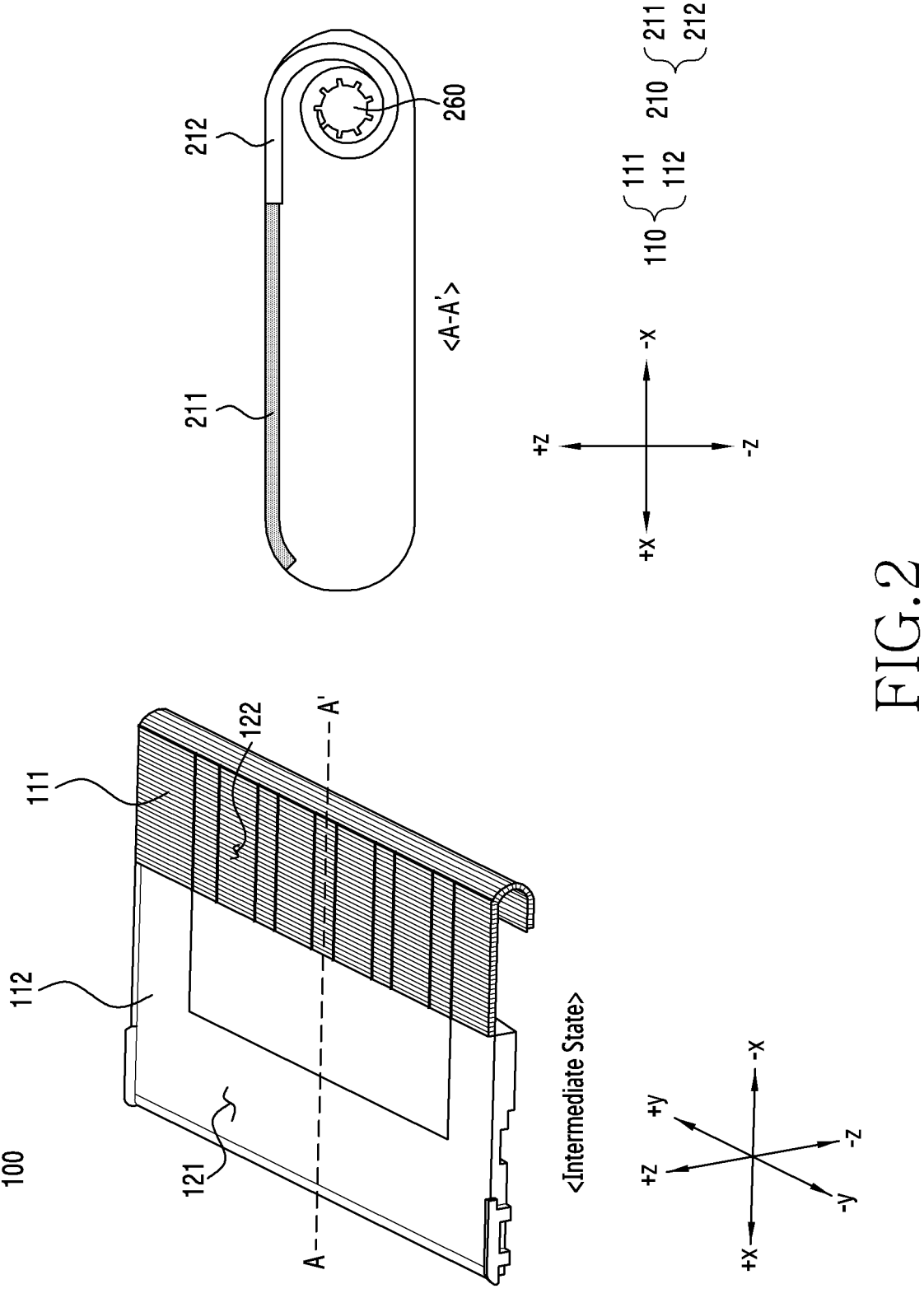
FIG. 2 illustrates a front perspective view of the electronic device according to an embodiment.

FIG. 2 illustrates a front perspective view of the electronic device according to an embodiment.

FIG. 2 is a front perspective view illustrating an intermediate state of the electronic device. The intermediate state may refer to a state in which the electronic device 100 is in the process of being switched from the first state 100a (e.g., the contracted state) to the second state 100b (e.g., expanded state).

FIG. 2 illustrates the electronic device 100 viewed in the direction P of FIG. 1.

The drawing <A-A'> is a view illustrating a cross section of the electronic device 100 taken along line A-A'.

The electronic device 100 may include a housing 110, a flexible display 120, and a roller 260. The flexible display 120 may include a pixel layer and a window 210.

The roller 260 may be disposed inside the housing 110. According to an embodiment, at least a portion of the flexible display 120 may be configured to be wound around the roller 260.

The window 210 may be disposed on top of the pixel layer.

The window 210 may include a non-rolling portion 211 and a rolling portion 212. The non-rolling portion 211 may correspond to, for example, the first portion 121 of FIG. 1, and the rolling portion 212 may correspond to the second portion 122 in FIG. 1. For example, the non-rolling portion 211 of the window 210 may be always visually exposed to the exterior, and at least a portion of the rolling portion 212 of the window 210 may be selectively exposed to the exterior of the electronic device based on the sliding state of the electronic device.

The non-rolling portion 211 may be provided on the second housing 112. The rolling portion 212 may be provided on the first housing 111. The rolling portion 212 may be provided adjacent to the roller 260.

When the electronic device 100 is switched from the second state 100b to the first state 100a, the flexible display 120 may be wound around the roller 260. According to an embodiment, as the flexible display 120 is wound around the roller 260, at least a portion of the rolling portion 212 of the electronic device 100 may be drawn into the interior of the electronic device 100.

A specific embodiment related to the window 310 will be described later with reference to FIGS. 3, 4, and 5. The window 310 includes different thicknesses. Since a part of the flexible display is wound about roller 260, the window 310 includes a first region 311, and second region 312, and a third region 313. The third region 313 which is the thinnest is disposed in the portion of the second part 122 of the display 120 that is wound about the roller 260. The second region 312 is between the disposed at the border of the first part 121 and the second part 122 of the display 120. The second region 312 has an incline 371 in thickness. The incline 371 in thickness can cause the content that is displayed to appear seamless from the second part 122 of the display 120 to the first part 121 to the user.

Figure 3:
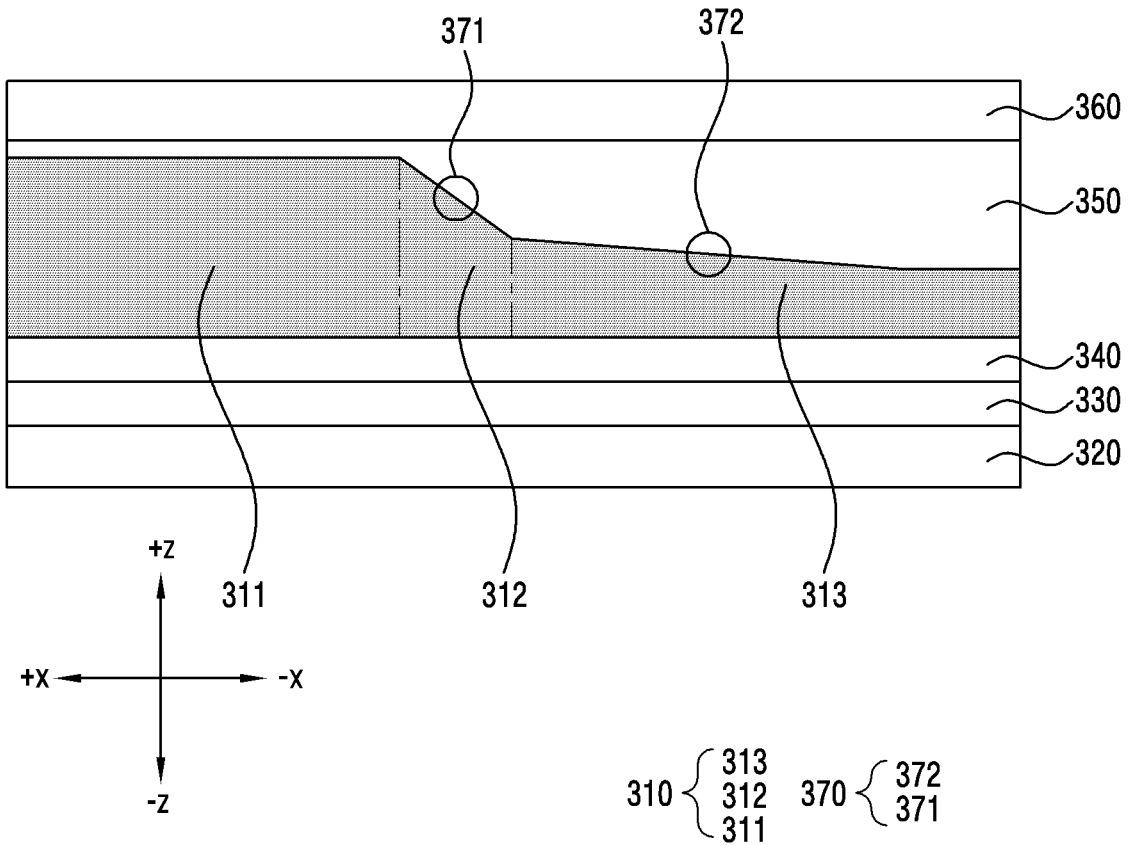
FIG. 3 is a view illustrating a laminated structure of a display of an electronic device according to an embodiment.

FIG. 3 is a view illustrating a laminated structure of a display of an electronic device according to an embodiment.

Referring to FIG. 3, the flexible display 120 of the electronic device 100 according to an embodiment may include a pixel layer 320 and a window 310. The flexible display 120 of the electronic device 100 according to certain embodiments may further include at least one of an absorption layer 330, a coating layer 350, and a protective layer 360.

The pixel layer 320 can include organic light emitting diodes (OLEDs) or (AMOLEDs) and thin film transistors (TFT) that make up the actual pixels that display content.

A window 310 to be described later may correspond to the window 210 described above with reference to FIG. 2.

The absorption layer 330 may be laminated between the window 310 and the pixel layer 320. The absorption layer 330 may have a thickness of 48 μm. However, the thickness of the absorption layer 330 is not limited thereto. For example, the absorber layer 330 may have a thickness greater than 48 μm.

By forming the absorption layer 330, it is possible to prevent damage to the pixel layer 320 from an external impact.

The window 310 to be described later may correspond to the window described above with reference to FIG. 2. The window 310 may be formed of a transparent material. For example, the window 310 may include at least one of a glass material and a transparent plastic material, or some combination, thereof.

The window 310 may include a first region 311, a second region 312, and a third region 313.

The thickness of the window 310 may change based on an inclination 370. The inclination 370 may include a first inclination 371 and a second inclination 372.

For example, the window 310 may include a first region 311 in which the thickness of the window 310 is substantially constant, constant, or within 3% of constant (constant shall now be understood to include substantially constant or within 3% deviation).

The window 310 may include a second region 312 that extends from one end of the first region 311 and is configured such that the thickness of the window 310 gradually decreases, based on the first inclination 371, in a direction away from the one end of the first region 311.

The window 310 may include a third region 313 that extends from one end of the second region 312 and is configured such that the thickness of the window 310 gradually decreases, based on the second inclination 372, in a direction away from the one end of the second region 312.

Herein, the inclination 370 means that the thickness of the window 310 changes based on a curvature (round) or a diagonal. For example, the thickness of the window 310 may decrease or increase with a constant curvature in at least a partial region. According to another embodiment, the thickness of the window 310 may decrease or increase with a constant slope (substantially constant, or within 3%) in at least a partial region. In addition, the thickness of the window may change by mixing a constant curvature and a diagonal having a constant slope.

However, the inclination is not limited to a change in a curvature (round) or a diagonal. For example, the thickness of the window 310 may change so that a step is provided between regions having different thicknesses.

The first inclination 371 and the second inclination 372 may be different from each other. For example, the first inclination 371 may mean an amount of change in thickness of a curved surface that changes with a curvature, and the second inclination 372 may mean an amount of change in thickness of an inclined surface in which the thickness changes at a constant rate. As another example, the first inclination 371 may be greater than the second inclination 372. According to another embodiment, the first inclination 371 may be smaller than the second inclination 372.

When the thickness of the window 310 gradually decreases based on the inclination 370, it may include the case in which the thickness of the window 310 gradually decreases in a round or diagonal in a direction away from the first region 311.

At least a portion of the second region 312 and/or at least a portion of the third region 313 may be drawn into the interior of the electronic device as the flexible display 120 changes from the second state 100b to the first state 100a. For example, the third region 313 may be provided as a region corresponding to the rolling portion 212. For example, at least a portion of the second region 312 may be provided as a region corresponding to the rolling portion 212.

The flexible display 120 may be wound around the roller 260 as the electronic device 100 changes from the second state 100b to the first state 100a.

The flexible display 120 is wound around the roller 260, at least a portion of the second region 312 and/or at least a portion of the third region 313 may be drawn into the interior of the electronic device.

The height of the first region 311 in the first direction (e.g., the +z-direction) may be within a range of 0.1 mm to 0.5 mm. For example, the height of the first region 311 in the first direction may be within a range of about 0.1 mm to about 0.5 mm from the surface in which the window 310 and the adhesive layer 340 are in contact with each other.

The height of the second region 312 and the third region 313 in the first direction (e.g., the +z direction) may be within a range of 0.06 mm to 0.1 mm. For example, the height of the second region 312 and the third region 313 in the first direction may be within the range of about 0.06 mm to about 0.1 mm from the surface in which the window 310 and the adhesive layer 340 are in contact with each other.

The height of the second region 312 and the third region 313 in the first direction (e.g., the +z direction) may be within a range of 0.06 μm to 0.1 μm. For example, the height of the second region 312 and the third region 313 in the first direction may be within the range of about 0.06 μm to about 0.1 μm from the surface in which the window 310 and the adhesive layer 340 are in contact with each other.

The above-mentioned height in the first direction (e.g., the +z direction) may mean the thickness of the window 310. For example, the height in the first direction (e.g., the +z-direction) may mean the length of the window 310 extending in the first direction (e.g., the +z-direction) from the surface in which the window 310 and the adhesive layer 340 meet.

However, the heights of the first region 311, the second region 312, and the third region 313 are not limited thereto. For example, the heights of the second region 312 and the third region 313 in the first direction (e.g., the +z-direction) may be greater than 0.1 mm.

Since the thicknesses of the second region 312 and the third region 313 are smaller than the thickness of the first region 311, at least a portion of the second region 312 and the third region 313 may be drawn into the interior of the electronic device 100.

Referring to FIG. 3, the coating layer 350 according to an embodiment may be laminated on the window. The first surface of the coating layer 350 facing the front surface of the electronic device 100 may be in contact with the window 310, and the second surface of the coating layer 350 facing the rear surface of the electronic device 100 may be in contact with the protective layer 360.

The coating layer 350 may be formed of a material having a lower hardness than that of the window 310. The coating layer 350 may be formed of at least one of an optically clear adhesive (OCA) and an optically clear resin (OCR). The coating layer 350 may be formed of a transparent material.

According to an embodiment, since the coating layer 350 is provided, the same level of refractive index may be provided in the first region 311, the second region 312, and the third region 313 of the window 310. The electronic device 100 may include a display 120 with improved visibility since the boundaries between the first portion 121 and the second portion 122, as well as the first region 311, the second region 312, and the third region 313 do not appear visible from the exterior due to the same level of refractive index. Accordingly, content displayed in the pixel layer 320 appears continuous.

In addition, according to an embodiment, since the display 120 includes the coating layer 350, the electronic device 100 may implement the display 120 having a constant thickness while including the window 310 having a variable thickness structure. It is noted that the combined height of the coating layer 350 and the window 310 in the first, second, and third regions is substantially constant. Thus, the coating layer has different thicknesses in the different regions.

The flexible display 120 may further include an adhesive layer 340. For example, the adhesive layer 340 may be formed of a pressure-sensitive adhesive (PSA). The absorption layer 330 and the window 310 may adhere to each other by the adhesive layer 340.

It is noted that in certain embodiments, the coating layer 450 may be disposed below the window 410, and directly above the absorption layer 330.

Figure 4:
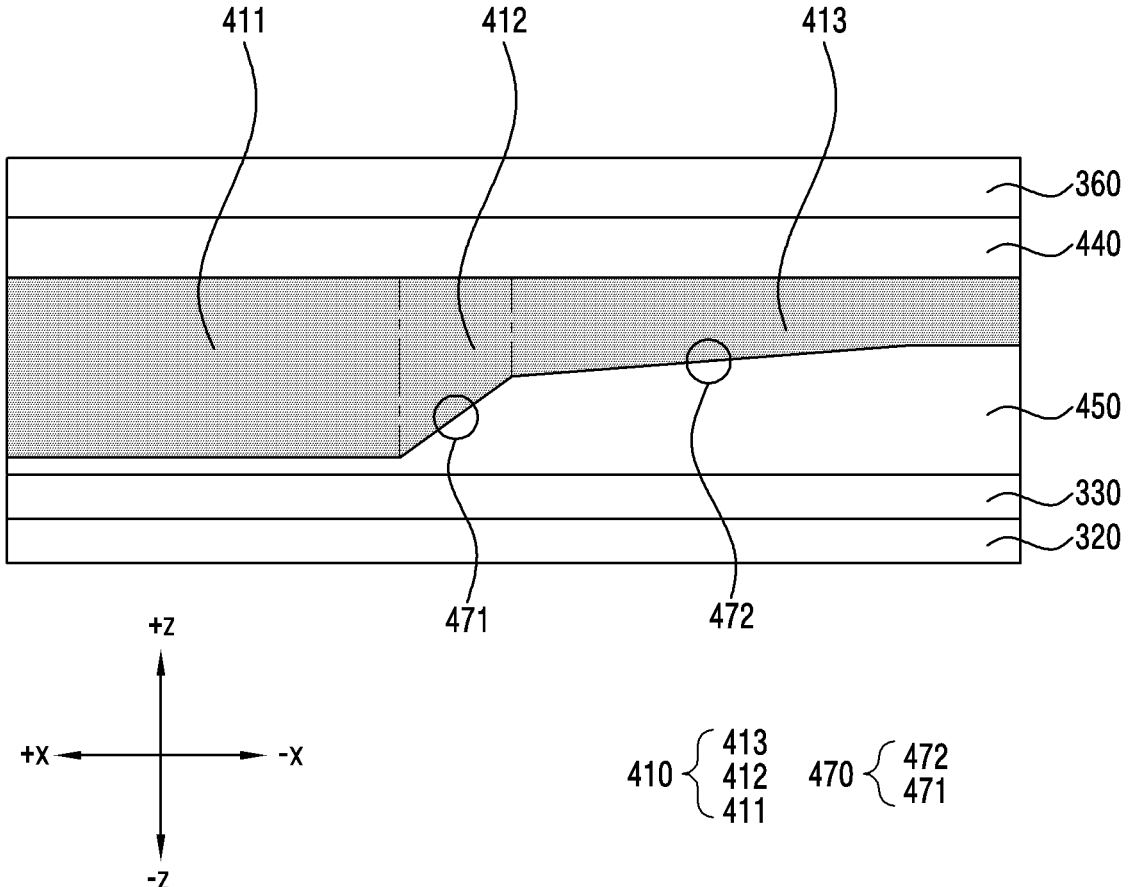
FIG. 4 is a view illustrating a laminated structure of a display of an electronic device according to another embodiment.

FIG. 4 is a view illustrating a laminated structure of a display of an electronic device according to another embodiment.

FIG. 4 is a view illustrating a coating layer 450 disposed between the window 410 and the display module 420, unlike the coating layer 350 in FIG. 3.

The window 410 may include a first region 411, a second region 412, and a third region 413.

The thickness of the window 410 may vary based on the inclination 470. According to one embodiment, the inclination 470 may include a first inclination 471 and a second inclination 472.

For example, the window 410 may include a first region 411 in which the thickness of the window 410 is constant.

The window 410 may include a second region 412 that extends from one end of the first region 411 and is configured such that the thickness of the window 410 gradually decreases, based on the first inclination 471, in a direction away from the one end of the first region 411.

The window 410 may include a third region 413 that extends from one end of the second region 412 and is configured such that the thickness of the window 410 gradually decreases, based on the second inclination 472, in a direction away from the one end of the second region 412.

The second region 412 and the third region 413 may be provided in the form of being gradually spaced apart from the pixel layer 320 or the absorption layer 330. As the second region 412 and the third region 413 are provided in the form of being spaced apart from each other, the display 120 may include an empty space. For example, an empty space may be provided between the second region 412 and the third region 413 and the absorption layer 330.

The coating layer 450 may be disposed in the empty space. For example, the coating layer 450 may be laminated between the window 410 and the display module 420. According to another embodiment, the coating layer 450 may be laminated between the window 410 and the absorption layer 430.

The inclination 470 described with reference to FIG. 4 may refer to the inclination 370 of FIG. 3. The coating layer 450 may be formed of substantially the same material as the coating layer 350 described above with reference to FIG. 3.

The flexible display 120 may further include an adhesive layer 440. The adhesive layer 440 of FIG. 4 may refer to the adhesive layer 340 of FIG. 3. For example, the adhesive layer 440 may be formed of a pressure-sensitive adhesive (PSA).

The adhesive layer 440 may be disposed between the protective layer 360 and the window 410. The protective layer 360 and the window 410 may adhere to each other by the adhesive layer 440.

Figure 5:
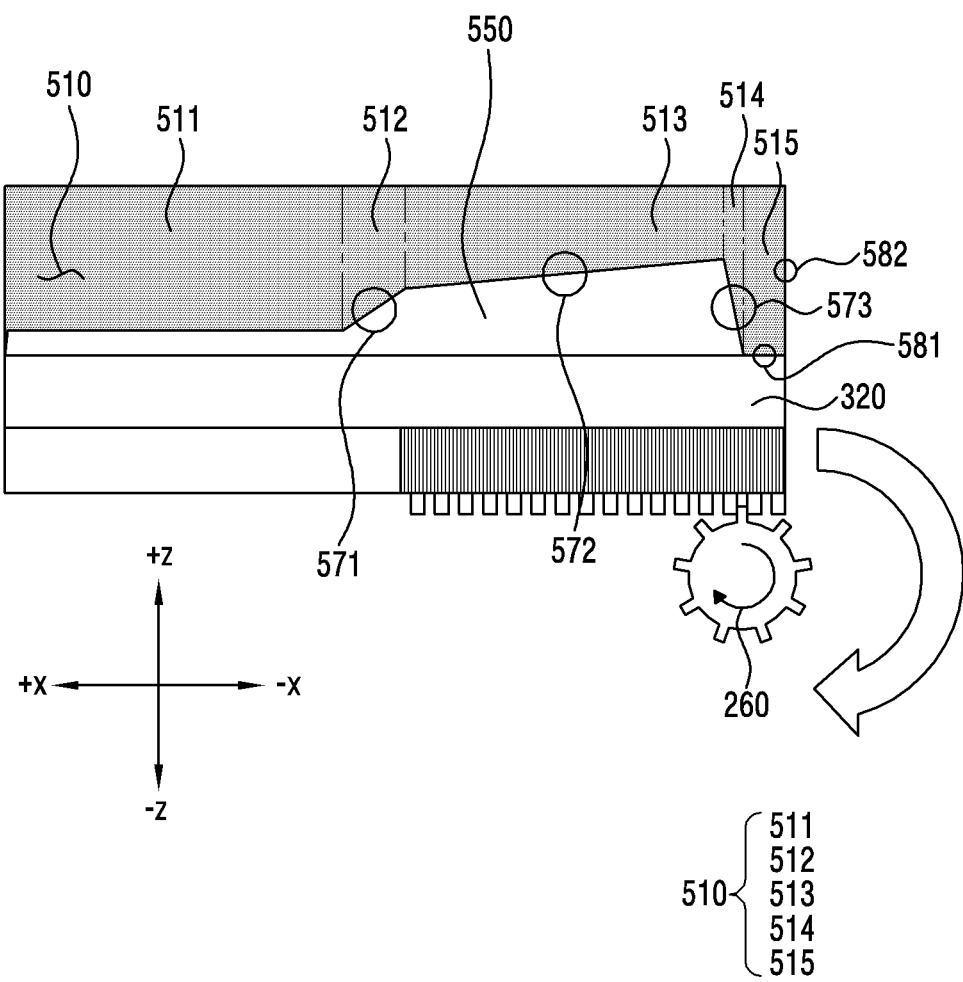
FIG. 5 is a view illustrating a laminated structure of a display of an electronic device according to another embodiment.

FIG. 5 is a view illustrating a laminated structure of a display of an electronic device according to another embodiment.

FIG. 5 is a view illustrating a laminated structure in which a portion of the window 510 of the electronic device 100 directly adheres to the pixel layer 320, according to an embodiment.

The window 510 of FIG. 5 may further include a fourth region 514 and a fifth region 515.

By further including the fourth region 514 and the fifth region 515, the electronic device 100 may implement a structure of the display 120 having improved adhesion. For example, since the fifth region 515 of the window directly faces and adheres to the pixel layer 320, the electronic device 100 may implement the structure of the display 120 with improved adhesion.

The coating layer 550 may be laminated on the pixel layer 320, and the window 510 may be stacked on the coating layer 550.

The window 510 may include a first region 511, a second region 512, a third region 513, a fourth region 514, and a fifth region 515.

The fifth region 515 may include an end of the window 510 on the roller 260 side.

The fourth region 514 may be omitted.

As the flexible display 120 is wound around the roller, at least a portion of the fourth region 514 and at least a portion of the fifth region 515 may be drawn into the interior of the electronic device 100.

The fourth region 514 may extend from the third region 513. The fourth region 514 may extend from one end of the third region 513.

The fourth region 514 may include a third inclination 573. For example, the fourth region 514 may include a region in which the thickness of the window 510 gradually increases, based on a third inclination 573 that is distinguished from the first inclination 571 and the second inclination 572, in a direction away from the one end of the third region 513.

The first inclination 571, the second inclination 572, and the third inclination 573 mean that the thickness of the window 510 changes based on a round or a diagonal. The thickness of the window 510 may decrease or increase with a constant curvature in at least a partial region.

The thickness of the window 510 may decrease or increase with a constant slope in at least a partial region. In addition, the thickness of the window 510 may change by mixing a constant curvature and a diagonal having a constant slope.

For example, the thickness of the window 510 of the fourth region 514 may increase with a constant curvature. According to another embodiment, the thickness of the window 310 of the fourth region 514 may increase with a constant slope. According to another embodiment, the thickness of the window 310 of the fourth region 514 may increase by mixing a constant curvature and a diagonal having a constant slope. According to an embodiment, one surface of the fourth region 514 of the window 510 may face the coating layer 550.

The fifth region 515 may extend from the fourth region 514. The fifth region 515 may include a region in which the thickness of the window 510 is constant.

The first surface 581 of the fifth region 515 may directly face the pixel layer 320. The second surface 582 perpendicular to the first surface 581 may face the first housing 111 (FIG. 1) of the electronic device 100 in the first state 100*a*.

According to an embodiment, since the fifth region 515 of the window 510 directly faces the pixel layer 320, the fifth region 515 of the window 510 and the pixel layer 320 may directly adhere to each other. According to an embodiment, since at least one region of the window 510 and the pixel layer 320 directly adhere to each other, the electronic device 100 may implement the structure of a display 120 having improved adhesion.

Figure 6:
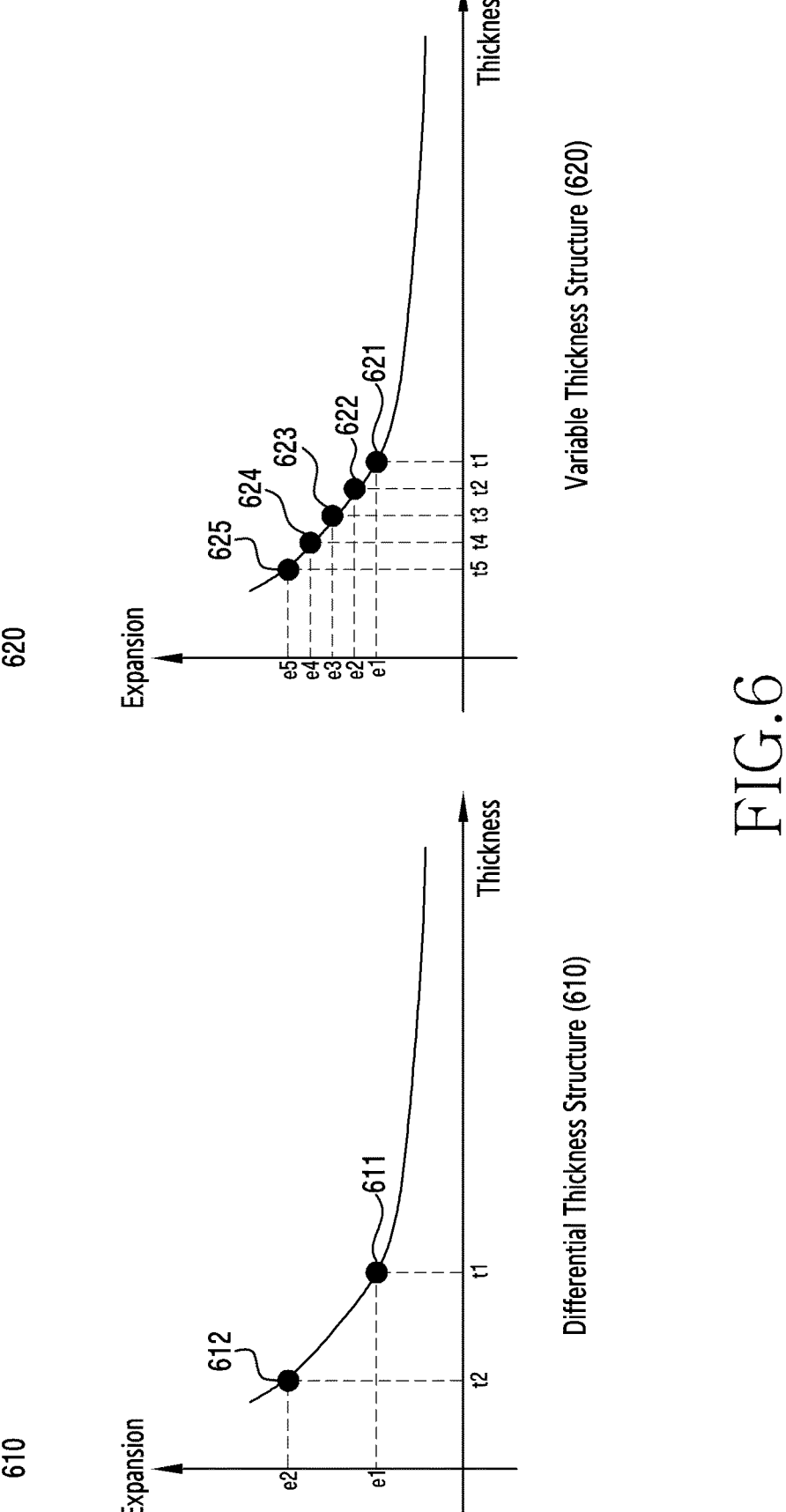
FIG. 6 illustrates graphs representing characteristics of a display having a variable thickness on a rolling portion according to an embodiment.

FIG. 6 illustrates graphs representing characteristics of a display having a variable thickness on a rolling portion according to an embodiment.

FIG. 6 illustrates graphs showing an expansion rate depending on the thickness of the window 310. Referring to FIG. 6, each horizontal axis represents the thickness of the window 310, and each vertical axis represents the expansion rate or flexibility of the window 310 or the display 120. As can be seen, when the thickness is less, the window 310 or display 120 is more flexible. The flexibility of the window 310 is generally the flexibility of the display 120 since the window 310 is the most rigid part of the display 120.

As the amount of change in the thickness of the window 310 increases, the amount of change in the expansion rate of the window 310 may increase. For example, as the difference between the thicknesses of the respective regions of the window 310 increases, the expansion rate of the window 310 or the display 120 may increase.

When the electronic device 100 has a variable thickness structure 620 in the window 310 in which the thickness gradually changes, the amount of change in the expansion rate of the window 310 or the display 120 may be reduced compared to the case in which the electronic device 100 has a differential thickness structure 610 of the window 310 in which the thickness is discretely changed, within a specific thickness range.

For example, the graph of the differential thickness structure 610 may include a first point 611 having a first expansion rate e1 at a first thickness t1 and a second point 612 having a second expansion rate e2 at a second thickness t2. According to an embodiment, as the thickness of the electronic device decreases from the first thickness t1 to the second thickness t2, the expansion rate of the window 310 or the display 120 may increase from the first expansion rate e1 to the second expansion rate e2.

The graph of the variable thickness structure 620 may include a first point 621 having a first expansion rate e1 when the window 310 has a second thickness t1, a second point 622 having a second expansion rate e2 when the window 310 has a second thickness t2, a third point 623 having a third expansion rate e3 when the window 310 has a third thickness t3, a fourth point 624 having a fourth expansion rate e4 when the window 310 has a fourth thickness t4, and a fifth point 625 having a fifth expansion rate e5 when the window 310 has a fifth thickness t5.

As the thickness of the electronic device decreases from the first thickness t1 to the second thickness t2, the expansion rate of the window 310 may increase from the first expansion rate e1 to the second expansion rate e2.

As the amount of change in the thickness of the window 310 increases, the amount of change in the expansion rate of the window 310 or the display 120 may increase, and as the amount of change in the thickness of the window 310 decreases, the amount of change in the expansion rate of the window 310 or the display 120 may decrease.

Referring to the graph of FIG. 6, The variable thickness structure 620 may include the change amount of the expansion rate (e2–e1) of the window 310 or the display 120 as decreasing from the first thickness t1 of the first point 621 to the second thickness t2 of the second point 622.

The differential thickness structure 610 may include the amount of change in the expansion rate (e2–e1) as the thickness decreases from the first thickness t1 of the first point 611 to the second thickness t2 of the second point 612.

Referring to the graph of FIG. 6, as the thickness change amount (t2–t1) of the variable thickness structure 620 is smaller than the change amount (t2–t1) of the differential thickness structure 610, the change amount of the expansion rate (e2–e1) of the variable thickness structure 620 may be smaller than that of the differential thickness structure 610.

When the change amount of the expansion rate (e2–e1) of the window 310 or the display 120 increases, wrinkles may occur on a boundary surface of the display 120 of the electronic device 100. Accordingly, visibility of the electronic device 100 may be reduced.

When the electronic device 100 includes the display 120 having the variable thickness structure 620, the change amount of the expansion rate (e2–e1) of the window 310 or the display 120 may decrease. Accordingly, since wrinkles due to the expansion of the window 310 or the display 120 do not occur on a boundary surface the window 310 having the variable thickness structure 620, the electronic device 100 may include a display 120 with improved visibility.

Figure 7:
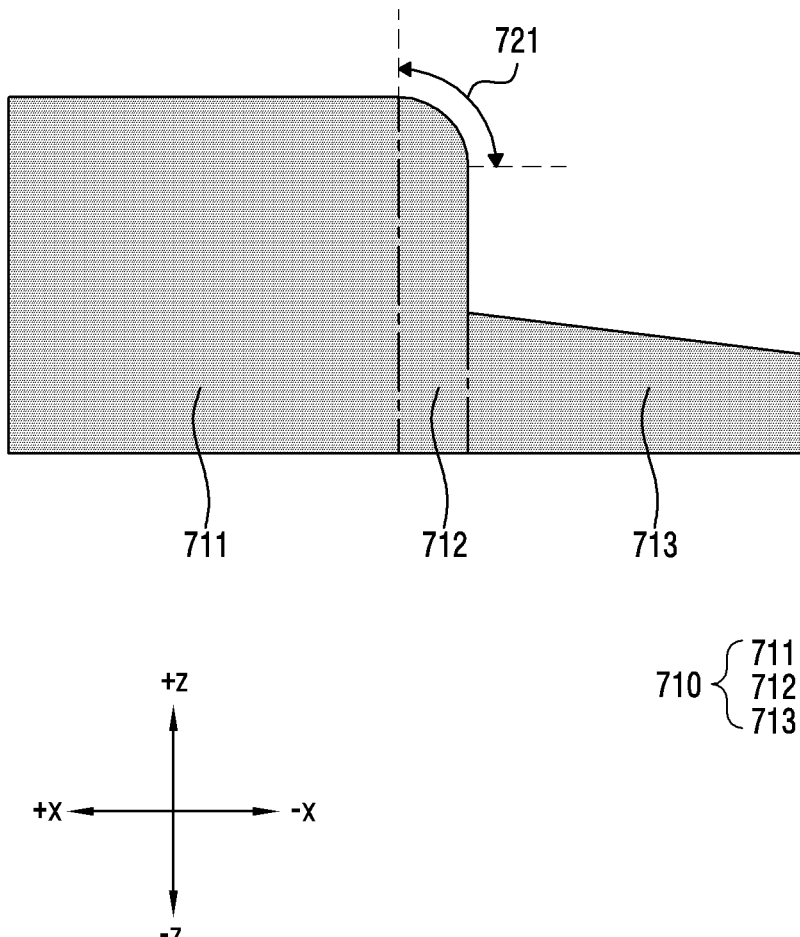
FIG. 7 is a view illustrating a cross section of a window according to an embodiment.

FIG. 7 is a view illustrating a cross section of a window according to an embodiment.

The window 710 may include a first region 711, a second region 712, and a third region 713. The first region 711 may include a region in which the thickness of the window 710 is constant.

The second region 712 may extend from one end of the first region 711 and may be configured as a region in which the thickness of the window 710 gradually decreases, based on a first inclination, in a direction away from the one end of the first region 711.

The second region 712 may include a first boundary surface 721. The first boundary surface 721 of the second region 712 may be provided adjacent to the first region 711. The first boundary surface 721 may be connected to the first region 711 and may have a first curvature.

The first boundary surface 721 extends from the first region 711, and may provide a boundary surface in which the thickness of the window gradually decreases, based on the first curvature, in a direction away from the first region 711.

According to an embodiment, by providing the first boundary surface 721 of the second region 712, the window 710 may be configured as a window 720 having a gradually reduced thickness.

According to an embodiment, as the thickness of the window 710 gradually decreases, the change amount of the expansion rate (e2–e1) of the window 310 or the display 120 according to the change in the thickness of the window 710 decreases. Thus, the electronic device 100 may include a display 120 with improved visibility.

Figure 8:
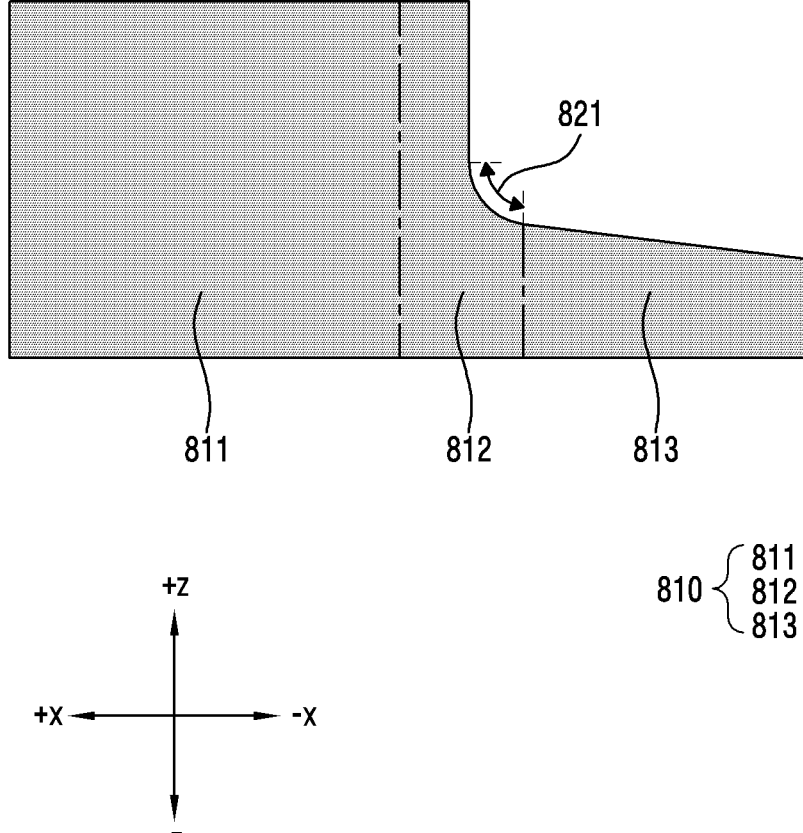
FIG. 8 is a view illustrating a cross section of a window according to another embodiment.

FIG. 8 is a view illustrating a cross section of a window according to another embodiment.

According to an embodiment, FIG. 8 may include a second region 812 having a shape different from that of the window 710 of FIG. 7.

The window 810 may include a first region 811, a second region 812, and a third region 813. The first region 811 may include a region in which the thickness of the window 810 is constant.

The second region 812 may extend from one end of the first region 811 and may be configured as a region in which the thickness of the window 810 gradually decreases, based on a first inclination, in a direction away from the one end of the first region 811.

The second region 812 may include a first boundary surface 821. According to an embodiment, unlike the first boundary surface 721 of the second region 712 of FIG. 7, the first boundary surface 821 of the second region 812 of FIG. 8 may be provided adjacent to the third region 813. The first boundary surface 821 may be connected to the third region 813 and may have a first curvature.

The first boundary surface 821 is connected to the third region 813, and may provide a boundary surface in which the thickness of the window gradually decreases, based on the first curvature, in a direction toward the third region 813.

According to an embodiment, as the thickness of the window 810 gradually decreases, the change amount of the expansion amount (e2–e1) of the window 310 or the display 120 according to the change of the thickness of the window 810 decreases. Thus, the electronic device 100 may include a display 120 with improved visibility.

Figure 9:
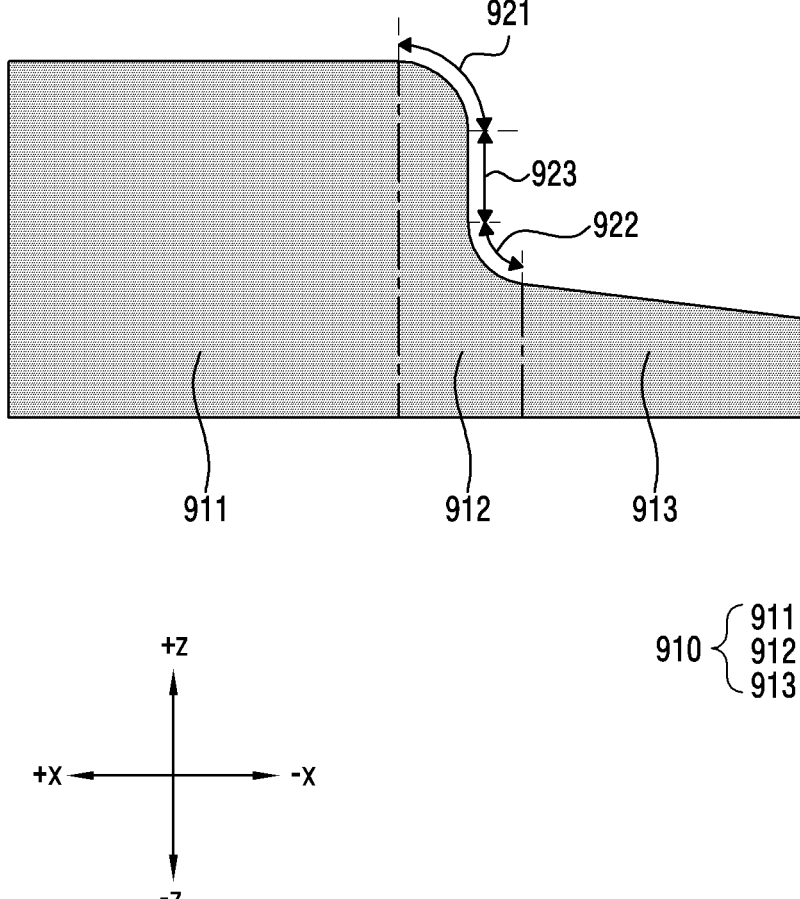
FIG. 9 is a view illustrating a cross section of a window according to another embodiment.

FIG. 9 is a view illustrating a cross section of a window according to another embodiment.

According to an embodiment, FIG. 9 may include a second region 912 having a shape different from that of the window 810 of FIG. 8.

The window 910 may include a first region 911, a second region 912, and a third region 913. The first region 911 may include a region in which the thickness of the window 910 is constant.

The second region 912 may extend from one end of the first region 911 and may be configured as a region in which the thickness of the window 910 gradually decreases, based on a first inclination, in a direction away from the one end of the first region 911.

The second region 912 of the window 910 of FIG. 9 may be provided in the form in which the second region 712 of the window 710 of FIG. 7 and the second region 812 of the window 810 of FIG. 8 are mixed.

The second region 912 may include a first boundary surface 921, a second boundary surface 922, and a first inclined surface 923. The first boundary surface 921 may be provided adjacent to the first region 911, and the second boundary surface 922 may be provided adjacent to the third region 913.

The first boundary surface 921 may be connected to the first region 911 and may have a first curvature. The second boundary surface 922 may be connected to the third region 913 and may have a second curvature.

The first boundary surface 921 extends from the first region 911, and may be provided as a boundary surface in which the thickness of the window gradually decreases, based on the first curvature, in a direction away from the first region 911.

The second boundary surface 922 is connected to the third region 913, and may be provided as a boundary surface in which the thickness of the window gradually decreases, based on the second curvature, in a direction toward the third region 913.

The second region 912 may include a first inclined surface 923 that extends from the first boundary surface 921 and configured such that the thickness of the window gradually decreases based on the first inclination. The second region 912 may be provided as a region that extends from the first boundary surface 921 to form a first inclined surface 923 and is connected to the second boundary surface 922.

According to an embodiment, by providing the first boundary surface 921, the second boundary surface 922, and the first inclined surface 923 of the second region 912, the thickness of the window 910 may gradually decrease.

According to an embodiment, as the thickness of the window 910 gradually decreases, the change amount of the expansion amount (e2–e1) of the window 310 or the display 120 according to the change in the thickness of the window 910 decreases. Thus, the electronic device 100 may include a display 120 with improved visibility.

Figure 10:
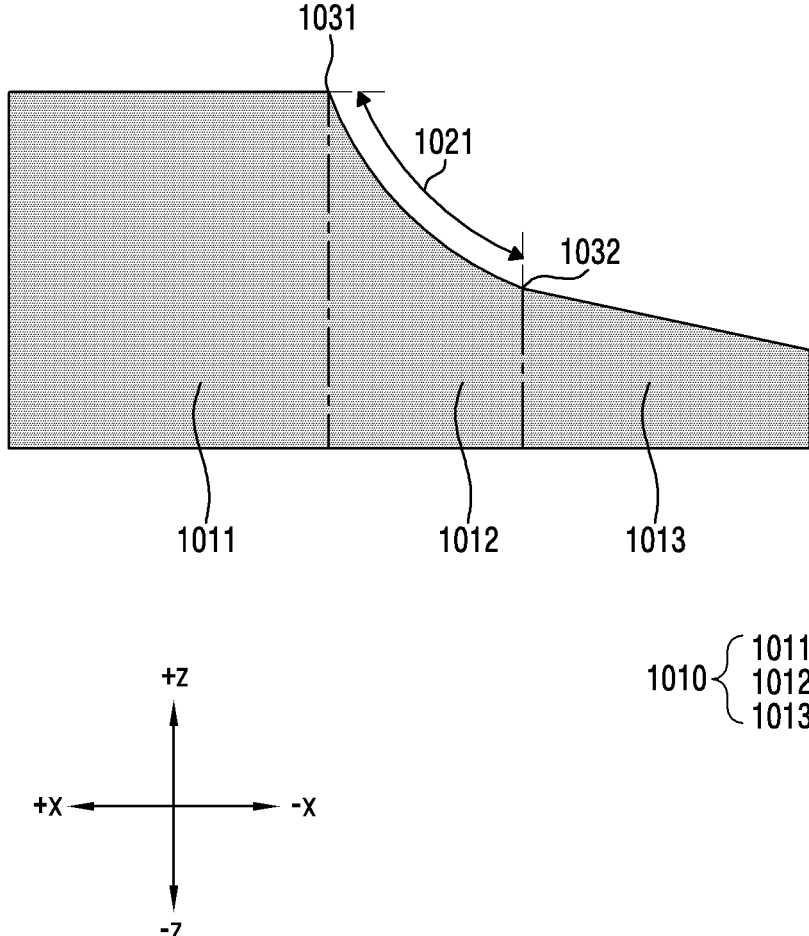
FIG. 10 is a view illustrating a cross section of a window according to another embodiment.

FIG. 10 is a view illustrating a cross section of a window according to an embodiment.

The window 1010 may include a first region 1011, a second region 1012, and a third region 1013. The first region 1011 may include a region in which the thickness of the window 1010 is constant.

The second region 1012 may extend from one end of the first region 1011 and may be configured as a region in which the thickness of the window 1010 gradually decreases, based on a first inclination, in a direction away from the one end of the first region 1011.

The first inclination may include a first curvature 1021. For example, the second region 1012 may be configured as a region in which the thickness of the window 1010 gradually decreases based on the first curvature 1021.

The surface of the window 1010 that is oriented in the first direction (e.g., the +z-direction) may be referred to as the top surface, and the surface oriented in the second direction (e.g., the −z direction) may be referred to as the bottom surface.

The second region 1012 may be provided from the upper end 1031 of the second region 1012 adjacent to the first region 1011 to the lower end 1032 of the second region 1012 adjacent to the third region 1013 while forming a first curvature 1021.

For example, the thickness of the window 1010 may gradually decreases while forming the first curvature 1021 in the form in which the slope starts from verticality at the upper end 1031 of the second region 1022 and gradually changes into horizontality toward the lower end 1032 of the second region 1022.

According to an embodiment, since the thickness of the window 1010 of the second region 1012 gradually decreases with the first curvature 1021, the change amount of the expansion rate (e2–e1) of the window 310 or the display 120 is reduced. Thus, the electronic device 100 may include a display 120 with improved visibility.

Figure 11:
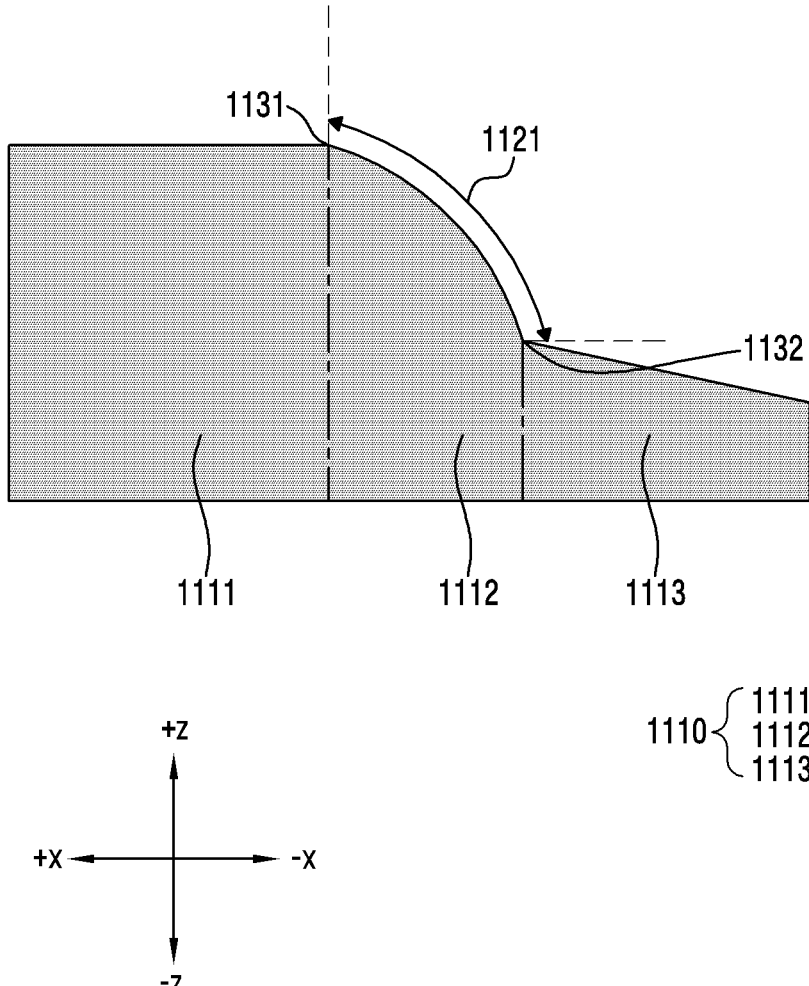
FIG. 11 is a view illustrating a cross section of a window according to another embodiment.

FIG. 11 is a view illustrating a cross section of a window according to an embodiment.

The window 1110 may include a first region 1111, a second region 1112, and a third region 1113. The first region 1111 may include a region in which the thickness of the window 1110 is constant.

The second region 1112 may extend from one end of the first region 1111 and may be configured as a region in which the thickness of the window 1110 gradually decreases, based on a first inclination, in a direction away from the one end of the first region 1111.

The first inclination may include a first curvature 1121. The second region 1112 may be configured as a region in which the thickness of the window 1110 gradually decreases based on the first curvature 1121.

For example, the second region 1112 may be provided from the upper end 1131 of the second region 1112 adjacent to the first region 1111 to the lower end 1132 of the second region 1112 adjacent to the third region 1113 while forming a first curvature 1121.

The first curvature 1121 in FIG. 11 may be distinguished from the first curvature 1021 in FIG. 10. The first curvature 1121 of the second region 1112 may be configured to be inverse to the first curvature 1021 of the second region 1012 in FIG. 10.

For example, the thickness of the window 1120 may gradually decrease while forming the first curvature 1121 in the form in which the slope starts from horizontality at the upper end 1131 of the second region 1122 and gradually changes into verticality toward the lower end 1132 of the second region 1122.

According to an embodiment, since the thickness of the window 1110 of the second region 1112 gradually decreases with the first curvature 1121, the change amount of the expansion rate (e2–e1) of the window 310 or the display 120 is reduced. Thus, the electronic device 100 may include a display 120 with improved visibility.

Figure 12:
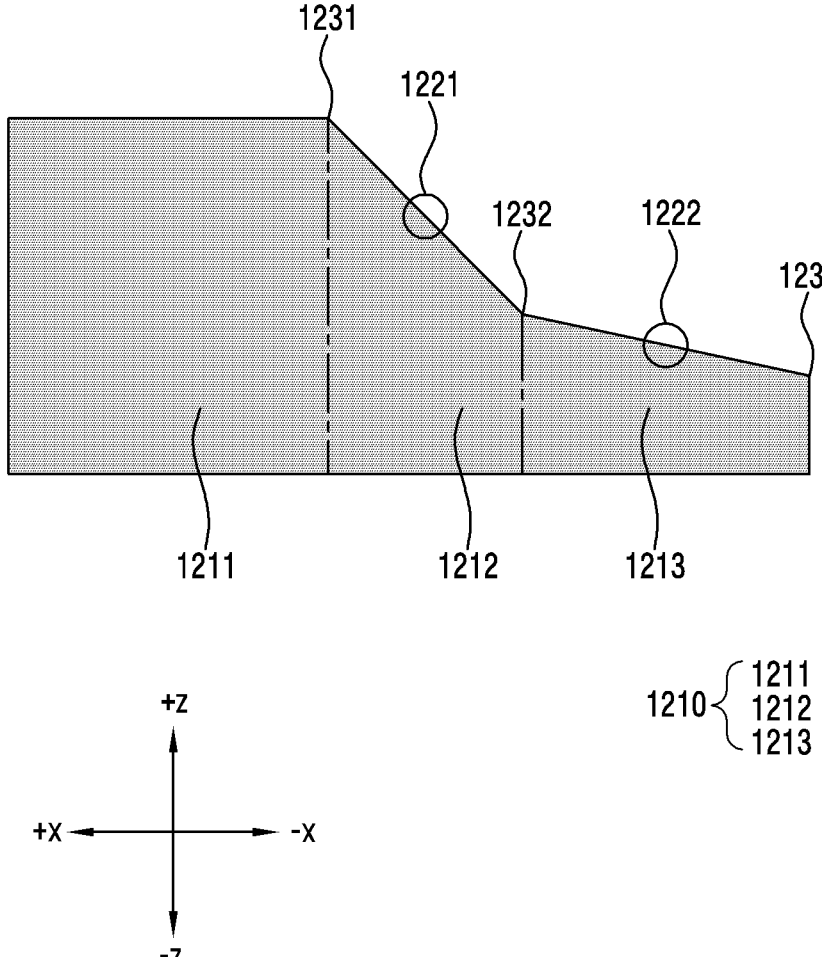
FIG. 12 is a view illustrating a cross section of a window according to another embodiment.

FIG. 12 is a view illustrating a cross section of a window according to an embodiment.

The window 1210 may include a first region 1211, a second region 1212, and a third region 1213. The first region 1211 may include a region in which the thickness of the window 1210 is constant.

The second region 1212 may extend from one end of the first region 1211 and may be configured as a region in which the thickness of the window 1210 gradually decreases, based on a first inclination, in a direction away from the one end of the first region 1211.

The third region 1213 may extend from one end of the second region 1212 and may be configured as a region in which the thickness of the window 1210 gradually decreases, based on a second inclination, in a direction away from the one end of the second region 1212.

The first inclination may include a first slope 1221. The second region 1212 may be configured in the form in which the thickness of the window 1210 gradually decreases while forming a diagonal based on the first slope 1221.

For example, the second region 1212 may be configured in a constant first slope 1221 from a first end 1231 of the second region 1212 adjacent to the first region 1211 to a second end 1232 of the second region 1212 adjacent to the third region 1213.

The second inclination may include a second slope 1222. The third region 1213 may be configured in the form in which the thickness of the window 1210 gradually decreases while forming a diagonal based on the second slope 1222.

For example, the third region 1213 may be configured in a constant second slope 1222 from the second end 1232 of the second region 1212 to the third end 1233 of the third region 1213.

The first inclination and the second inclination may be distinguished from each other. For example, the first inclination may include an inclination having a first slope 1221, and the second inclination may include an inclination having a second slope 1222. For example, the first slope 1221 may have a slope of a first size, and the second slope 1222 may have a slope of a second size smaller than the first size.

However, the sizes of the slopes are not limited thereto. For example, the second slope 1222 may have a slope of a second size greater than the first size of the first slope 1221.

The thickness of the window 1220 may gradually decrease while forming the first slope 1221 from the first end 1231 of the second region 1212 to the second end 1232 of the second region 1212.

According to another embodiment, the thickness of the window 1220 may gradually decrease while forming the second slope 1222 from the second end 1232 of the second region 1212 to the third end 1233 of the third region 1213.

According to an embodiment, when the thickness of the window 1210 gradually decreases with the first slope 1221 and the second slope 1222, the change amount of the expansion rate (e2−e1) of the window 1220 according to the change in the thickness of the window 1220 may be reduced.

Through this, the electronic device 100 may include a display 120 with improved visibility.

Figure 13:
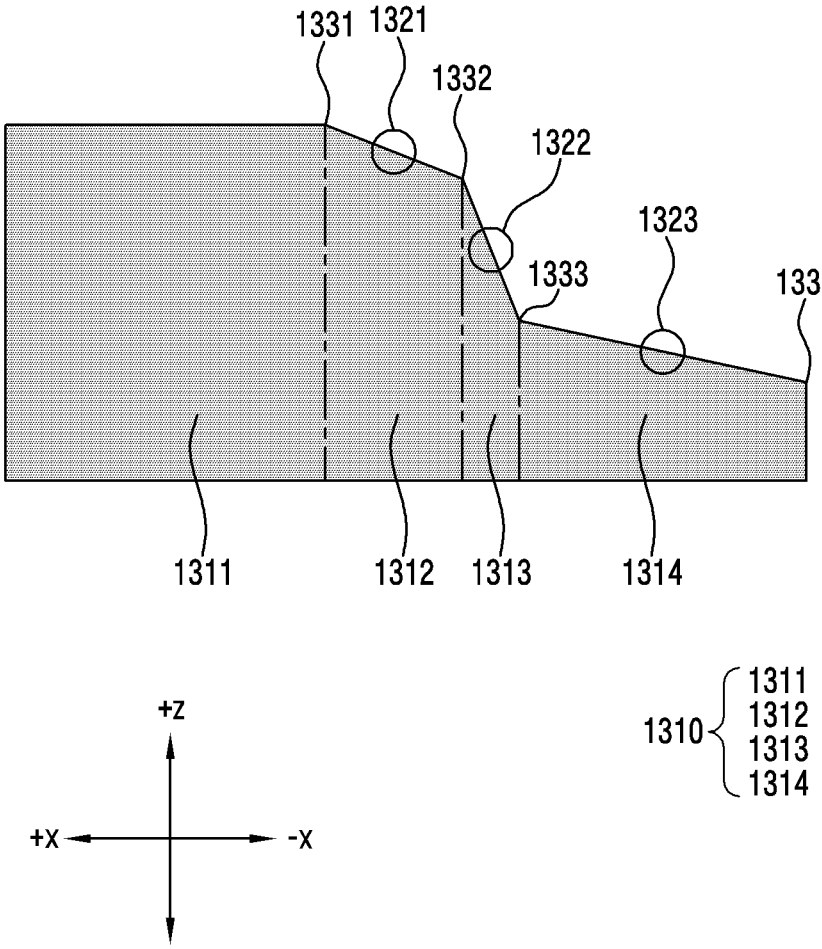
FIG. 13 is a view illustrating a cross section of a window according to another embodiment.

FIG. 13 is a view illustrating a cross section of a window according to another embodiment.

The window 1310 may include a first region 1311, a second region 1312, a third region 1313, and a fourth region 1314. The first region 1311 may include a region in which the thickness of the window 1310 is constant.

The second region 1312 may extend from one end of the first region 1311 and may be configured as a region in which the thickness of the window 1310 gradually decreases, based on a first inclination, in a direction away from the one end of the first region 1311.

The third region 1312 may extend from one end of the second region 1312 and may be configured as a region in which the thickness of the window 1310 gradually decreases, based on a second inclination, in a direction away from the one end of the second region 1312.

The fourth region 1312 may extend from one end of the third region 1313 and may be configured as a region in which the thickness of the window 1310 gradually decreases, based on a third inclination, in a direction away from the one end of the third region 1313.

The first inclination may include the inclination of the first slope 1321, the second inclination may include the slope of the second slope 1322, and the third inclination may include the inclination of the third slope 1323.

According to an embodiment, one or more of the first slope 1321, the second slope 1321, and the third slope 1323 are distinguished from each other. For example, the first slope 1321 may have a slope of a first size, and the second slope 1322 may have a slope of a second size greater than the first size. In addition, the third slope 1323 may have a slope of a third size that is greater than the slope of the first size but smaller than the slope of the second size.

However, the sizes of the first slope 1321, the second slope 1322, and the third slope 1323 are not limited thereto. For example, the first slope 1321 may have a slope of a first size, the second slope 1322 may have a slope of a second size smaller than the first size, and the third slope 1323 may have a sloe of a third size smaller than the second size.

The second region 1312 may be configured as a region in which the thickness of the window 1310 gradually decreases while forming a diagonal having the first slope 1321.

The third region 1313 may be configured as a region in which the thickness of the window 1310 gradually decreases while forming a diagonal having the second slope 1321.

The fourth region 1313 may be configured as a region in which the thickness of the window 1310 gradually decreases while forming a diagonal having the third slope 1321.

For example, the second region 1312 may be configured to have a constant first slope 1321 from a first end 1331 of the second region 1312 adjacent to the first region 1311 to a second end 1332 of the second region 1312 adjacent to the third region 1313.

For example, the third region 1313 may be configured to have a constant second slope 1322 from the second end 1332 of the second region 1312 to the third end 1333 of the third region 1312 adjacent to the fourth region 1314.

For example, the fourth region 1314 may have a constant slope 1323 from the third end 1333 of the third region 1313 adjacent to the fourth region 1314 to the fourth end 1324 of the fourth region 1314.

According to an embodiment, by further including the fourth region 1314 and configuring an inclined structure having a constant inclination, the electronic device 100 may include a window 1220 in which the change amount of the expansion rate (e2−e1) of the window 310 or display 120 according to a change in the thickness of the window 1220. Accordingly, the electronic device 100 may include a display 120 with improved visibility.

Figure 14:
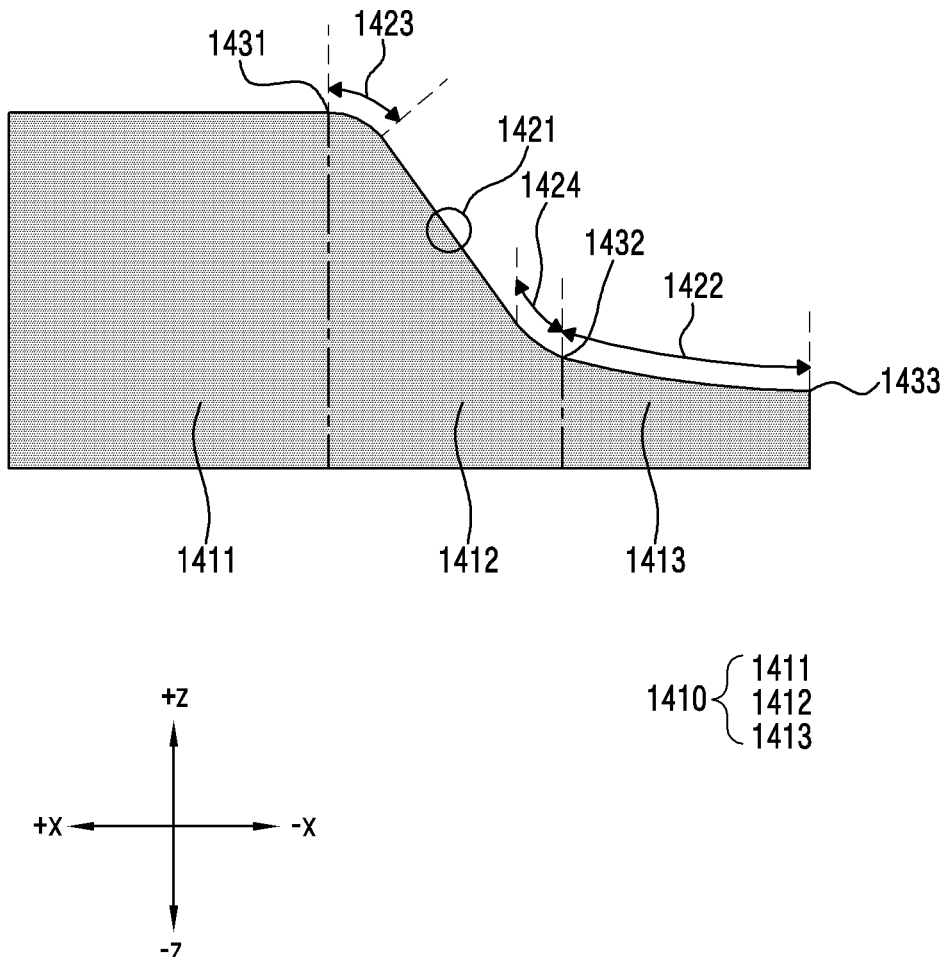
FIG. 14 is a view illustrating a cross section of a window according to another embodiment.

FIG. 14 is a view illustrating a cross section of a window according to another embodiment.

The window 1410 may include a first region 1411, a second region 1412, and a third region 1413. The first region 1411 may include a region in which the thickness of the window 1410 is constant.

The cross section of the window 1410 of FIG. 14 may be configured as a cross section of a window in which the window 910 of FIG. 9 and the window 1010 of FIG. 10 are mixed.

The second region 1412 may extend from one end of the first region 1411 and may be configured as a region in which the thickness of the window 1410 gradually decreases, based on a first inclination, in a direction away from the one end of the first region 1411.

The third region 1413 may extend from one end of the second region 1412 and may be configured as a region in which the thickness of the window 1410 gradually decreases, based on a second inclination, in a direction away from the one end of the second region 1412.

The first inclination may include an inclination of a first slope 1421, and the second inclination may include a first curvature 1422.

The second region 1412 may include a first boundary surface 1423, a second boundary surface 1424, and a first inclined surface. The first boundary surface 1423 may be provided adjacent to the first region 1411, and the second boundary surface 1424 may be provided adjacent to the third region 1413. The first inclined surface may be provided as an inclined surface having a first slope 1421.

The first boundary surface 1423 may be connected to the first region 1411 and may have a second curvature. The second boundary surface 1424 may be connected to the third region 1413 and may have a third curvature.

The first boundary surface 1423 extends from the first region 1411, and may provide a boundary surface in which the thickness of the window gradually decreases, based on the second curvature, in a direction away from the first region 1411.

The second boundary surface 1424 is connected to the third region 1413, and may provide a boundary surface in which the thickness of the window gradually decreases, based on the third curvature, in a direction toward the third region 1413.

The second region 1412 may be configured as region that is configured as a first inclined surface extending from the first boundary surface 1423 to have the first slope 1421 and connected to the second boundary surface 1424.

The third region 1413 may be configured as a region in which the thickness of the window 1410 gradually decreases based on the first curvature 1422.

For example, the third region 1413 may be configured, based on the first curvature 1422, from the end of the second boundary surface 1424 of the second region 1012 adjacent to the third region 1413 to the lower end 1433 of the third region 1413.

However, the boundaries and inclinations of the second region 1412 and the third region 1413 are not limited thereto.

For example, the third region 1413 may include a first boundary surface 1423, a second boundary surface 1424, and a first inclined surface having a first slope 1421, and the second region 1412 may include an inclination having a first curvature 1422.

According to another embodiment, the second region 1412 may include a first boundary surface 1423, a second boundary surface 1424, and an inclination having a first curvature 1422.

According to an embodiment, by further including the first boundary surface 1423 of the second region 1412, the first inclined surface having the first slope 1421, the second boundary surface 1424, and the third region 1413 having the first curvature 1422, the electronic device 100 may include a window 1220 in which the change amount of the expansion rate (e2–e1) of the window 310 or the display 120 according to the change in the thickness of the window 1220 is reduced.

Accordingly, the electronic device 100 may include a display 120 with improved visibility.

The cross sections of the second and third regions of the window 310 of FIG. 3, the window 410 of FIG. 4, and the window 510 of FIG. 5 may include the cross section of at least one of the windows of FIGS. 7 to 14.

For example, the cross section of the window 310 of FIG. 3 may refer to the window 710 of FIG. 7.

According to another embodiment, the cross section of the window 310 of FIG. 3 may have that of the window 1410 of FIG. 14.

According to another embodiment, the second region 312 of the window 310 of FIG. 3 may have the cross section of the window 1410 of FIG. 13, and the third region 313 may have the cross-section of the window 1010 of FIG. 10.

Figure 15:
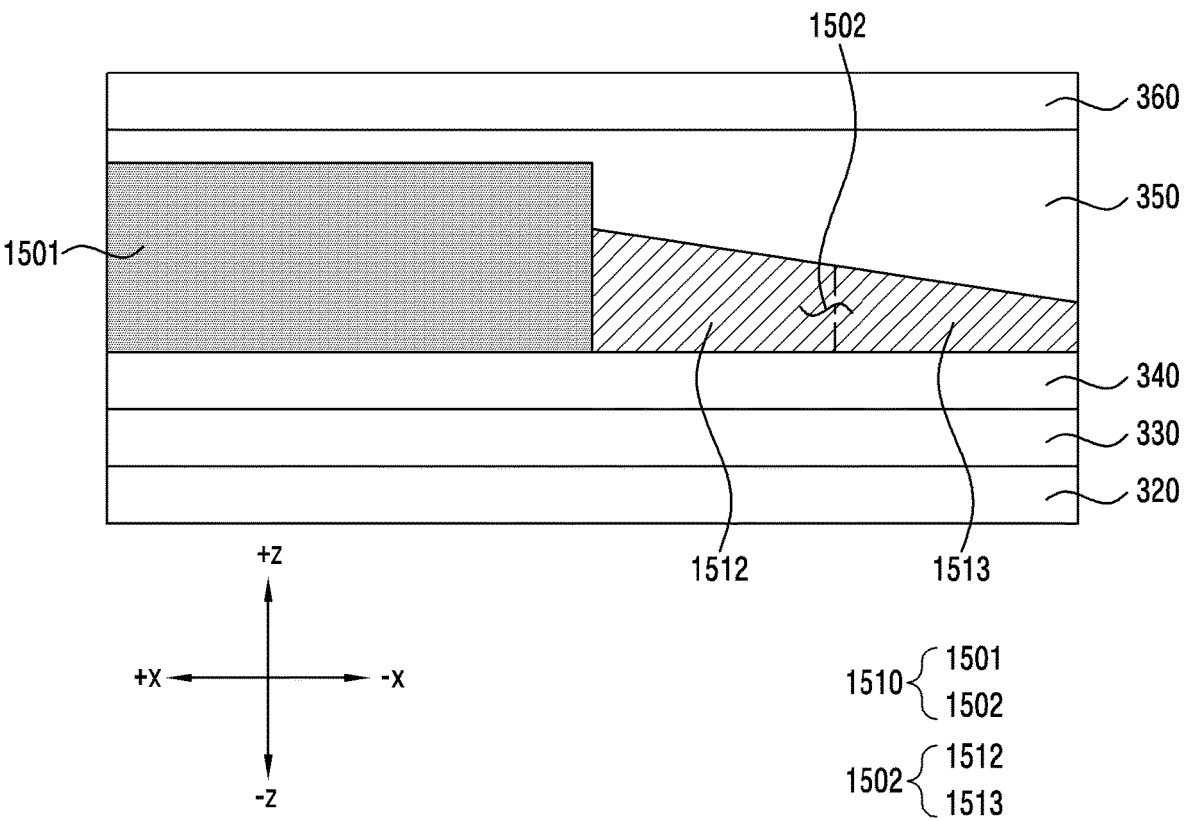
FIG. 15 is a view illustrating a laminated structure of a display of an electronic device according to an embodiment.

FIG. 15 is a view illustrating a laminated structure of a display of an electronic device according to an embodiment.

Referring to FIG. 15, the flexible display 120 of the electronic device 100 according to an embodiment may include a pixel layer 320 and a window 1510. According to certain embodiments, the flexible display 120 may further include at least one of an absorption layer 330, a coating layer 350, or a protective layer 360.

The window 1510 may include a first window portion 1501 and a second window portion 1502 disposed adjacent to the first window portion. The first window portion 1501 may include a first region. The second window portion 1502 may include a second region 1522 and/or a third region 1513.

The first window portion 1501 and the second window portion 1502 may be laminated on the absorption layer 330 by an adhesive layer.

The first window portion 1501 may be disposed on the first portion 121 of the display 120, and the second window portion 1502 may be disposed on the second portion 122 of the display 120.

According to an embodiment, as the electronic device 100 changes from the second state 100b to the first state 100a, the second region 1522 and the third region 1523 of the second window portion 1502 may be at least partially drawn into the interior of the electronic device 100.

The first window portion 1501 and the second window portion 1502 may be distinguished from each other. For example, the thickness of the first window portion 1501 and the thickness of the second window portion 1502 may be different from each other. However, the difference between the first window portion 1501 and the second window portion 1502 is not limited to the above-mentioned difference in thickness.

For example, the length of the first window portion 1501 extending in one direction (e.g., the +y-direction) and the length of the second window portion 1502 extending in one direction (e.g., the +y-direction) may be different from each other. According to another embodiment, the material of the first window portion 1501 may be formed of a material having an expansion rate different from that of the second window portion 1502.

The second window portion 1502 may be configured as a window including a cross section of at least one of the windows of FIGS. 7 to 14.

For example, the second region 1512 of the second window portion 1502 may be configured to have the cross-section of the window 710 of FIG. 7, and the third region 1513 may be configured to have the cross-section of the window 1010 of FIG. 10.

According to an embodiment, by dividing the window into the first window portion 1501 and the second window portion 1502, the electronic device 100 may include a display that blocks the occurrence of wrinkles according to the amount of change in the expansion rate (e2–e1) of the display 120.

In addition, the display 120 having a differential inclination may be easily manufactured by using separate windows.

Figure 16:
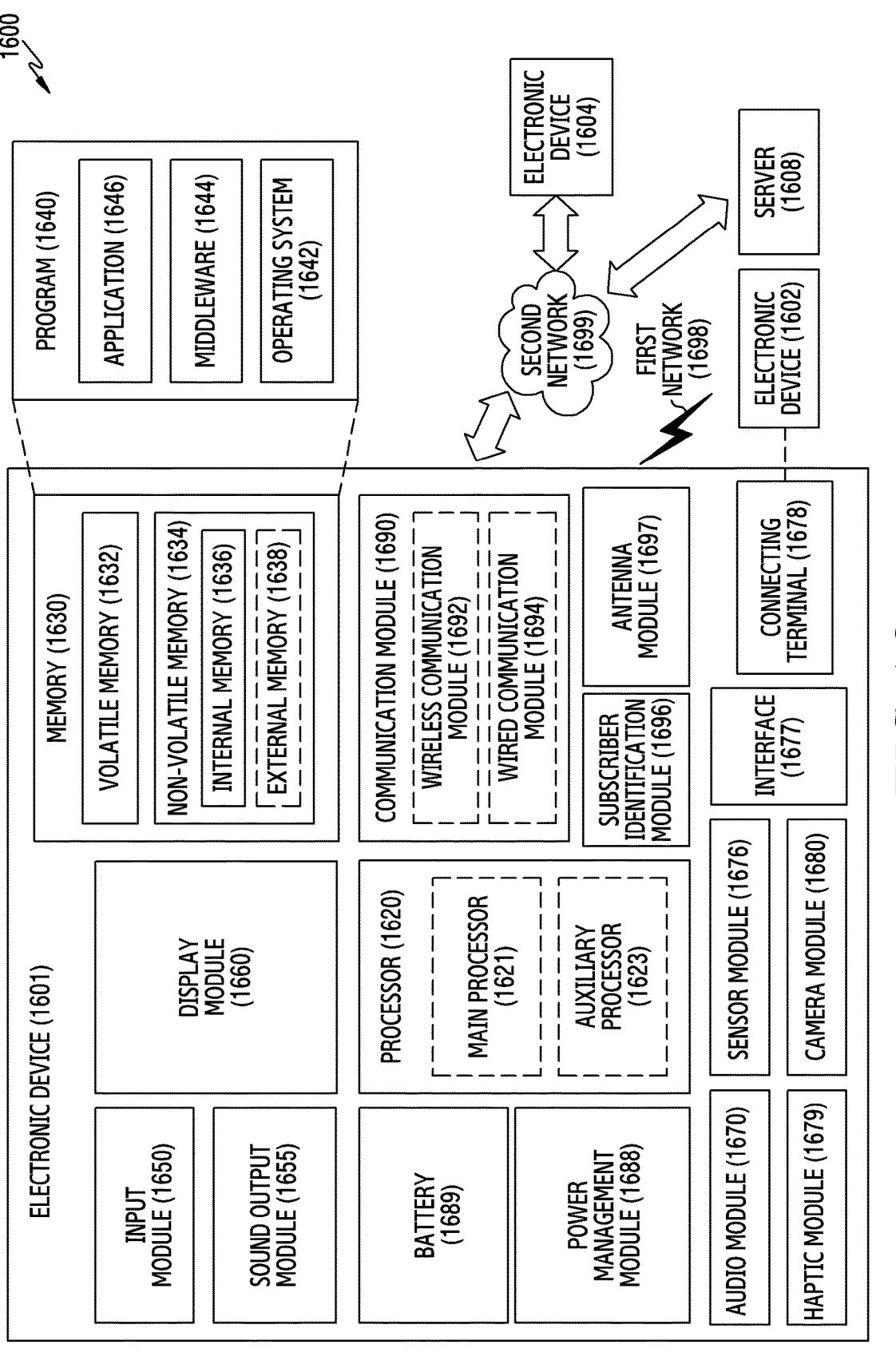
FIG. 16 is a view schematically illustrating an electronic device according to an embodiment within a network environment.

FIG. 16 is a view schematically illustrating an electronic device according to an embodiment within a network environment.

FIG. 16 is a block diagram illustrating an electronic device 1601 in a network environment 1600 according to certain embodiments. Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). The electronic device 1601 may communicate with the electronic device 1604 via the server 1608. The electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. The processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). The auxiliary processor 1623 (e.g., an image signal processor or a communication processor) may be implemented as part of another component (e.g., the camera module 1680 or the communication module 1690) functionally related to the auxiliary processor 1623.

The auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. The receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. The display module 1660 may include a touch sensor adapted to detect a touch, or a pressure sensor adapted to measure the intensity of force incurred by the touch.

The audio module 1670 may convert a sound into an electrical signal and vice versa. The audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. The sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. The interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). The connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. The haptic module 1679 may include, for example, a motor, a piezoelectric element, or an electric stimulator.

The camera module 1680 may capture a still image or moving images. The camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. The battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. The communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). The wireless communication module 1692 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. The antenna module 1697 may include an antenna including a radiating element composed of a conductive material or a conductive pattern formed in or on a substrate (e.g., a printed circuit board (PCB)). The antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

According to certain embodiments, the antenna module 1697 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an internet-of-things (IoT) device. The server 1608 may be an intelligent server using machine learning and/or a neural network. The external electronic device 1604 or the server 1608 may be included in the second network 1699. The electronic device

1601 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, a rollable display device may include: a housing; a roller disposed inside the housing; and a flexible display configured to be at least partially wound on the roller, the flexible display including a pixel layer and a window, wherein the window may include: a first region having a substantially constant thickness, a second region extending from one end of the first region having a thickness that gradually decreases with a first inclination, in a direction away from the one end of the first region, and a third region extending from one end of the second region having a thickness that gradually decreases, with a second inclination different from the first inclination, in a direction away from the second region, and wherein at least a portion of the second region and the third region may be configured to be drawn into interior of the rollable display device when the flexible display is wound around the roller.

According to an embodiment, the flexible display may include a coating layer laminated on the window.

According to an embodiment, the flexible display may include a coating layer, disposed between the window and the pixel layer.

According to an embodiment, the window may include a fourth region extending from the third region and a fifth region extending from the fourth region, wherein the fourth region has a thickness that gradually increases, with a third inclination different from the first inclination and the second inclination, in a direction away from the third region, wherein the fifth region has a substantially constant thickness and further comprises a first surface directly adhering to the pixel layer, and a second surface perpendicular to the first surface facing the housing of the rollable display device, and wherein at least a portion of the fourth region and at least a portion of the fifth region may be configured to be drawn into the interior of the rollable display device when the flexible display is wound around the roller.

According to an embodiment, the second region may include: a first boundary surface connected to the first region and having a first curvature, and a second boundary surface connected to the third region and having a second curvature.

According to an embodiment, the first inclination has a first curvature, and the second region has a thickness that gradually decreases based on the first curvature.

According to an embodiment, the first inclination has a first slope, and the second inclination has a second slope, wherein the second region has a thickness that gradually decreases while forming an oblique line having the first slope, and the third region has a thickness that gradually decreases while forming an oblique line having the second slope.

According to an embodiment, the first region may have a height in the first direction in a range of 0.1 mm to 0.5 mm, and the second region and the third region may have a height in the first direction in a range of 0.06 mm to 0.1 mm.

According to an embodiment, the first inclination has a first slope, and the second inclination has a first curvature, wherein the second region may include: a first boundary surface connected to the first region and having a second curvature different from the first curvature, and a second boundary surface connected to the third region and having a third curvature different from the first curvature and the second curvature, wherein the second region may extend from the first boundary surface and has a thickness that gradually decreases, based on the first slope, in a direction away from one end of the first boundary surface, and wherein the third region may extend from the second boundary surface of the second region, and has a thickness that gradually decreases, based on the first curvature, in a direction away from the second boundary surface of the second region.

According to an embodiment, the window may include a fourth region that faces one surface of the third region, wherein the fourth region may extend from another end of the third region and has a thickness that gradually decreases, based on a third inclination different from the first inclination and the second inclination, in a direction away from the another end of the third region, and at least a portion of the fourth region may be configured to be drawn into the rollable display device as the flexible display is wound around the roller.

According to an embodiment, the window may include a first window portion and a second window portion formed of a material different from that of the first window portion, wherein the first window portion forms the first region, and wherein the second window portion forms the second region and the third region.

According to an embodiment, the window may be formed of a transparent material.

According to an embodiment, the flexible display may include a protective layer, and the protective layer may be laminated on the window.

According to an embodiment, the flexible display may include an adhesive layer, and the adhesive layer may face the window, and adheres the window to adhere to a component of the flexible display.

According to an embodiment, the flexible display may include an absorption layer, and the absorption layer may be laminated between the pixel layer and the window and configured to absorb an impact on the flexible display.

According to various embodiments, the rollable display device may include: a housing; a roller disposed inside the housing; and a flexible display configured to be at least partially wound around the roller and including a window, wherein the window may include: a first window portion including a first region, wherein the first portion is always exposed to exterior, and a second window portion formed of a material different from that of the first window portion, wherein the second window portion may include: a second region facing one surface of the first region having a thickness that gradually decreases, with a first inclination, in a direction away from the one surface of the first region, and a third region extending from one end of the second region having a thickness that gradually decreases with a second inclination different from the first inclination, in a direction away from the one end of the second region, and wherein a part of the second window portion may be configured to be drawn into the rollable display device as the flexible display is wound around the roller.

According to an embodiment, the first inclination may include a first curvature, and the second region may be configured as a region in which the thickness of the window gradually decreases based on the first curvature.

According to an embodiment, the second region may include: a first boundary surface connected to the first region and having a first curvature, and a second boundary surface connected to the third region and having a second curvature.

According to an embodiment, the flexible display may include an absorption layer, and the absorption layer may be laminated on the flexible display to absorb an impact of the flexible display.

According to an embodiment, the window may be formed of a transparent material.

It shall be understood that the embodiments presented described above are not limiting. Changes to the above-described embodiments and those shown in the drawings, and various changes, modifications, or alterations may be made thereto without departing from the disclosure.

What is claimed is:

1. An electronic device comprising:
a housing;
a flexible display coupled to the housing and including a display module and a window disposed on the display module; and
a support member configured to deform at least a portion of the flexible display;
wherein the window includes:
a first region having a substantially constant thickness,
a second region extending from one end of the first region having a thickness that gradually decreases with a first inclination, in a first direction away from the one end of the first region, and
a third region extending from one end of the second region having a thickness that gradually decreases with a second inclination different from the first inclination, in the first direction away from the second region,
wherein the thickness of the third region begins gradually decreasing at the second inclination at a point where the thickness of the second region gradually decreasing at the first inclination ends, and
wherein at least a portion of the second region and the third region are configured to deform according to deformation of the flexible display.

2. The electronic device of claim 1, wherein the flexible display further includes a transparent coating layer disposed between the window and the display module, wherein a thickness of the transparent coating layer is substantially same in the first region and increases along the first direction in the second region.

3. The electronic device of claim 1, wherein the thickness of the transparent coating layer is configured to increase based on the first inclination along the first direction under the second area, and increase based on the second inclination along the first direction under the third region.

4. The electronic device of claim 2, wherein a sum of the thickness of the window and the thickness of the transparent coating layer is substantially the same in the first region, the second region, and the third region.

5. The electronic device of claim 4, wherein the window includes a fifth region extending from one end of the third region in the first direction, and a lower surface of at least a portion of the fifth region is substantially the same plane as the lower surface of the transparent coating layer.

6. The electronic device of claim 5, wherein at least part of the lower surface is directly or indirectly adhered to the display module.

7. The electronic device of claim 6, wherein another portion of the fifth region is located between the third region and at least a portion of the fifth region, and the thickness of the window gradually increases as it moves away from the end of the third region in the first direction.

8. The electronic device of claim 1, wherein the lower surface of the second region is formed as a surface with different curved surfaces.

9. The electronic device of claim 8, wherein the lower surface of the second region includes a first curved part and a second curved part that is a curved surface different from the first curved part, and a plane part is formed between the first curved part and the second curved part.

10. The electronic device of claim 9, wherein the first curved part has a first curve, and the second curved part has a second curve that is different from the first curve.

11. The electronic device of claim 1, wherein the lower surface of the second region includes a first curved surface with first curvature as the first inclination, and
    wherein the lower surface of the third region includes a second curved surface with a second inclination that is different from the first curvature.

12. The electronic device of claim 1, wherein the lower surface of the second region includes a first plane with the first slope as the first inclination, and wherein the lower surface of the third region includes a second plane that has a second slope different from the first slope as the second inclination.

13. The electronic device of claim 1, wherein the lower surface of the second region is formed as a curved surface, and wherein the lower surface of the third region includes a second plane with the first slope as the second inclination.

14. The electronic device of claim 1, wherein the lower surface of the second region includes a first plane with the first slope as the first inclination, and wherein the lower surface of the third region is formed as a curved surface.

15. The electronic device of claim 1, wherein the window includes a fourth region extending from one end of the third region,
    wherein the fourth region has a thickness that gradually decreases based on a third inclination that is distinguished from the first inclination and the second inclination as it moves away from the end of the third region in the first direction.

16. The electronic device of claim 1, wherein the first region of the window is formed with first material, and the second region or third region is formed with a second material different from the first material.

17. The electronic device of claim 1, wherein the flexible display includes the flexible display includes a window made of glass and a transparent coating layer disposed on the window,
    wherein the thickness of the transparent coating layer remains substantially the same over the first region, gradually increases based on the first inclination along the first direction over the second region, and gradually increases based on the second inclination along the first direction over the third region.

18. The electronic device of claim 1, wherein the transparent coating layer includes resin.

19. A flexible display device comprising,
    a display module; and
    a window provided on the display module;
    wherein the window includes:
    a first region having a substantially constant thickness,
    a second region extending from one end of the first region having a thickness that gradually decreases with a first inclination, in a first direction away from the one end of the first region, and
    a third region extending from one end of the second region and having a thickness that gradually decreases based on a second inclination that is different from the first inclination as it moves away from one end of the second region in the first direction,
    wherein the thickness of the third region begins gradually decreasing at the second inclination at a point where the thickness of the second region gradually decreasing at the first inclination ends.

20. The flexible display device of claim 19, wherein the flexible display further includes a transparent coating layer disposed between the window and the display module, wherein the thickness of the transparent coating layer remains substantially the same under the first region, increases based on the first inclination along the first direction under the second region and increases based on the second inclination along the first direction under the third region.

21. The flexible display device of claim 19, wherein the window extends from one end of the third region in the first direction and further includes a fourth region having a substantially constant thickness.

22. The flexible display device of claim 19, wherein a slope of the second region gradually increases as it moves away from the end of the first region in the first direction, and the slope of the second inclination gradually decreases as it moves away from the end of the second region.

23. The electronic device of claim 1, wherein the support member includes a roller that rolls at least a portion of the flexible display.

24. The electronic device of claim 23, wherein at least a part of the second region and at least a part of the third region are set to be drawn into or withdrawn from the inside of the housing in the first direction or a second direction opposite to the first direction according to the rolling of the roller.

25. The electronic device of claim 1, wherein at least one of the first inclination or the second inclination is a variable that changes based on curvature or a constant that changes based on a diagonal.

* * * * *